United States Patent
Ganesh et al.

(10) Patent No.: US 6,728,719 B1
(45) Date of Patent: Apr. 27, 2004

(54) METHOD AND MECHANISM FOR DEPENDENCY TRACKING FOR UNIQUE CONSTRAINTS

(75) Inventors: Amit Ganesh, San Jose, CA (US); Jonathan D. Klein, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 09/775,085

(22) Filed: Jan. 31, 2001

(51) Int. Cl.$^7$ .......................... G06F 17/00; G06F 12/00
(52) U.S. Cl. ................ 707/100; 707/205; 707/202
(58) Field of Search .................... 707/105, 8, 100, 707/102, 200, 203, 509; 717/115; 715/509

(56) References Cited

U.S. PATENT DOCUMENTS

| | | | |
|---|---|---|---|
| 5,140,685 A | | 8/1992 | Sipple et al. |
| 5,260,697 A | * | 11/1993 | Barrett et al. ............... 345/173 |
| 5,398,183 A | * | 3/1995 | Elliott ........................ 600/509 |
| 5,481,712 A | * | 1/1996 | Silver et al. ................. 717/109 |
| 5,504,917 A | * | 4/1996 | Austin ........................ 345/522 |
| 5,577,240 A | | 11/1996 | Demers et al. |
| 5,634,124 A | * | 5/1997 | Khoyi et al. ............ 707/103 R |
| 5,737,601 A | | 4/1998 | Jain et al. |
| 5,781,912 A | | 7/1998 | Demers et al. |
| 5,794,229 A | * | 8/1998 | French et al. .................. 707/2 |
| 5,940,826 A | | 8/1999 | Heideman et al. |
| 6,349,310 B1 | * | 2/2002 | Klein et al. ................. 707/200 |
| 6,397,227 B1 | * | 5/2002 | Klein et al. ................. 707/200 |
| 6,434,568 B1 | | 8/2002 | Bowman-Amuah |
| 6,442,748 B1 | | 8/2002 | Bowman-Amuah |
| 6,493,701 B2 | | 12/2002 | Ponnekanti |
| 6,496,850 B1 | | 12/2002 | Bowman-Amuah |

OTHER PUBLICATIONS

P. Rubin et al., "USIPS (User System Interface Prototyping System) A System for Evaluation and Development of Workstation Software for C Applications", IEEE, 1984.*
T.S. Perry, "Consumer Electronics", IEEE Spectrum, vol. 34, No. 1 Jan. 1997.*
Almeida, et al., "Panasync: Dependency tracking among file copies", ACM, pp. 7–12, 1997.
Baldoni, et al., "A Communication–Induced Checkpointing Protocol that Ensures Rollback–Dependency Trackability", IEEE, pp. 68–77, 1997.
Baldoni, et al., "Rollback–Dependency Trackability: Visible Characterizations", ACM, pp. 33–42, 1999.
Damani, et al, "Optimistic Distributed Simulation Based on Transitive Dependency Tracking", IEEE, pp. 90–97, 1997.
Elnozahy, "On the Relevance of Communication Costs of Rollback–Recovery Protocols", ACM, pp. 74–79, 1995.
Garcia, et al., "On the Minimal Characterization of the Rollback–Dependency Trackability Property", IEEE, pp. 342–349, 2001.
Louboutin, et al., "Comprehensive Distributed Garbage Collection by Tracking Causal Dependencies of Relevant Mutator Events", IEEE, pp. 516–525, 1997.
Sadri, "Integrity Constraints in the Information Source Tracking Method", IEEE, pp. 106–119, 1995.
Sreenivas, et al., "Independent Global Snapshots in Large Distributed Systems", IEEE, pp. 462–467, 1997.

* cited by examiner

Primary Examiner—Alford Kindred
(74) Attorney, Agent, or Firm—Bingham McCutchen LLP

(57) ABSTRACT

A method and mechanism for dependency tracking in a database system is disclosed. According to an embodiment, dependency tracking is performed for a uniqueness constrained object by tracking change or commit values for a key range associated with the uniqueness constrained object. For uniqueness constrained tables, this type of key range can be associated with a column or set of columns in the uniqueness constrained table.

24 Claims, 16 Drawing Sheets

Dependent SCN Table

| Transaction | dependent SCN | Transaction commit time |
|---|---|---|
| T1 | 0 | 5 |
| T2 | 0 | 10 |
| T3 | max (5,10) = 10 | 15 |
| T4 | 0 | 20 |
| T5 | max (15, 20) = 20 | 25 |

FIG. 3

| | 602 | | | |
|---|---|---|---|---|
| Key_Col | Col_1 | Col_2 | ... | Col_n |
| K0 | Col_1_val | Col_2_val | ... | Col_n_val |
| K4 | Col_1_val | Col_2_val | ... | Col_n_val |
| K10 | Col_1_val | Col_2_val | ... | Col_n_val |
| K12 | Col_1_val | Col_2_val | ... | Col_n_val |
| ⋮ | ⋮ | ⋮ | ⋮ | ⋮ |

610 — K0 row
612 — K4 row
614 — K10 row
616 — K12 row

Dependent SCN Tab 6

| Transaction | Dependent SCN | Transaction Commit Time |
|---|---|---|
| TXA | Max (LD_SCN of Key Range A-L, LD_SCN of Key Range M-Z) = (0,0)=0 | 5 |
| TXB | Row_SCN of Row 720 = 5 | 10 |
| TXC | Row_SCN of Row 722 = 5 | 15 |
| TXD | Max (LD_SCN of Key Range, 0) = max (10, 0) = 10 | 20 |
| TXE | Row_SCN of Row 724 = 5 | 25 |
| TXF | Max (LD_SCN of Key Range M-Z, 0) = max (25, 0) = 25 | 30 |

FIG. 8

| LD_SCN of Key Range M-Z |
|---|
| 30 |

| LD_SCN of Key Range A-L |
|---|
| 35 |

| emp-name | emp-dept |
|---|---|
| Smith | Legal |

METHOD AND MECHANISM FOR DEPENDENCY TRACKING FOR UNIQUE CONSTRAINTS

BACKGROUND OF THE INVENTION

1. Field of the Invention

The invention relates to computer systems, and more particularly to dependency tracking in a database system.

2. Background

The present invention pertains to dependency tracking in a database system. "Dependency" in a database system refers to the ordering in which operations may be performed against data items in the database. If a first operation is applied against a data item, and a second operation against that data item can only be applied after the first operation has been completed, then the second operation is said to be dependent upon the first operation. For example, consider a database statement to "UPDATE" a data item. That statement can only be processed after a prior statement to "INSERT" that data item into a database has completed (since the data item does not exist until the completion of the INSERT statement). Thus, the UPDATE statement in this example is dependent upon the INSERT statement.

A logical unit of work in a database system that comprises one or more database statements is often referred to as a transaction. When a database system executes a transaction, the transaction may perform a data operation upon a data item that was written or updated in response to the execution of previous transaction(s). Consequently, the results returned by the database system in response to executing any given transaction are dictated by changes made by a set of previously executed transactions. With respect to affected data items, the latest transaction is thus dependent upon previous transactions that have operated upon those data items.

For many reasons, it is useful to track dependencies between transactions in a database system. For example, assume that two transactions, TXA and TXB, must be reapplied to the database. This may occur, for example, if the database is recovering from a prior database failure and transactions are being reapplied to set the database back to its pre-failure state. As an another example, tracking dependencies is useful in determining the order in which transactions may be applied or propagated when replicating a database.

Dependency tracking is also useful with respect to database objects having uniqueness constraints. For a relational database table, a uniqueness constraint requires that every value in a column or set of columns to be unique—that is, no two rows of a table should have duplicate entries in a specified column or set of columns. For example, assume that a first transaction deletes a row from a table having a key value in a "uniqueness" column and a second transaction adds a new and different row to the table having the same key value in that column. The second transaction is dependent upon the execution and completion of the first transaction, since otherwise, there would be two rows in the table having the same key value in the column, which would violate the uniqueness constraint upon the column.

Dependency information can be extracted from log files in a database system. However, extracting and analyzing log files to determine/track dependencies is a very expensive to perform. Therefore, it is clearly desirable to provide a method and mechanism to track dependencies in a database statement.

SUMMARY OF THE INVENTION

The present invention is directed to a method and mechanism for dependency tracking in a database system. According to an embodiment of the invention, all dependencies for a transaction or operation can be characterized by a single value representing all prior transactions or database changes that it is dependent upon. This value can be calculated at various granularity levels, such as the granularity of the row level, based upon maintaining a data structure that records change or commit values for a specified granularity level for objects in a database. For granularity at the row level, a row_SCN value can be maintained according to an embodiment of the invention.

According to an aspect of an embodiment of the invention, dependency tracking is performed for uniqueness constrained objects by tracking change or commit values for a key range associated with the uniqueness constrained object. For uniqueness constrained tables, this type of key range can be associated with a particular column or set of columns in the uniqueness constrained table. If an index exists upon a uniqueness constrained column, then the key range can correspond to a range of index key values.

According to another aspect of an embodiment of the invention, dependency tracking for referentially constrained objects is performed by tracking change or commit values for certain key ranges as well as change or commit values at various granularities in the database. The combination of the various sets of change or commit values are employed to determine a single value representing all prior transactions or database changes that an operation or transaction is dependent upon.

Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 3 shows a table of dependent SCN values corresponding to an example sequence of database statements.

FIGS. 6A and 6B show a database table, and index associated with the database table, and a data structure to track delete operations made against certain key ranges in the index/table according to an embodiment of the invention.

FIG. 8 shows a table of dependent SCN values corresponding to an example sequence of database statements.

FIG. 10B shows a modified state for the child table of FIG. 10A.

DETAILED DESCRIPTION

Figure 1:
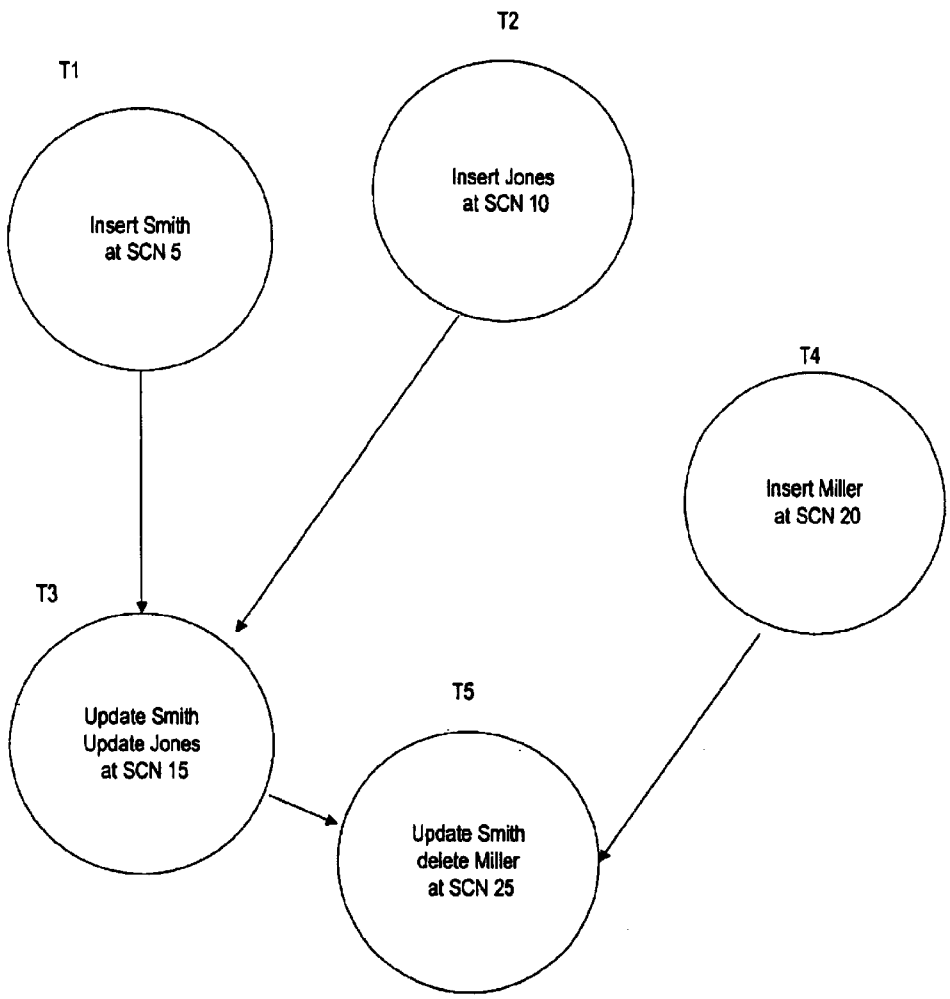
FIG. 1 illustrates a dependency tree for the example sequence of database statements.

The present invention is directed to a method and mechanism for tracking dependencies with respect to uniqueness constraints in a database system. The detailed description of the disclosed embodiment is directed to dependency tracking of changes to database tables at the row level, based upon dependency across transactions. However, the principles presented here are equally applicable to dependency tracking at other granularity levels and for database changes within transactions also, and thus the scope of the invention is not to be limited to the disclosed embodiment shown herein.

As stated above, a logical unit of work in a database system that comprises one or more database statements is often referred to as a transaction. In many database systems, a transaction begins when its first executable statement is encountered, e.g., a structured query language ("SQL") statement that queries or modifies a database table. "Committing" a transaction normally means that a transaction makes permanent the changes performed by database statements within the transaction (although the database arts include techniques to rollback even committed transactions). For each transaction that commits, an internal database tracking number can be assigned to the transaction that relates to the time at which the commit occurs. This tracking number is referred to herein as a "commit time" or system change number "SCN".

According to an embodiment of the invention, an SCN is a monotonically increasing number that increments each time a transaction commits. In this embodiment, the SCN corresponds to the relative ordering of commits by transactions rather than to the actual time of commit for each transaction. Thus, each transaction has a unique SCN which is ordered based upon the commit time of the transaction, with earlier committing transactions having lower SCNs than later committing transactions. However, other methods of implementing commit times or SCNs can be utilized within the present invention, including numerical SCNs that correspond to the actual time of commit for transactions.

Row Level Dependency Tracking

According to an embodiment of the invention, all dependencies for a transaction can be characterized by a single value representing all prior transactions that it is dependent upon. This single value is referred to herein as a dependent SCN or "dep_SCN". The dep_SCN is determined by taking the maximum value of the SCNs for all transactions it is immediately dependent upon. The dep_SCN represents an ordering value that establishes the absolute latest commit time for prior transactions that a transaction is dependent upon.

To illustrate, assume that a transaction TXC is immediately dependent upon transactions TXA and TXB. Further assume that TXA has a SCN of 5 and TXB has a SCN of 10. The dep_SCN of transaction TXC would be 10, which is the maximum of 5 and 10. The significance of the dep_SCN value is that it can be used to presume that transaction TXC is not dependent upon any transactions having a SCN greater than 10. Thus, when ordering transactions, TXC can be placed earlier than or in parallel to any transactions having a SCN greater than 10.

With respect to all transactions that TXC is dependent upon, the dep_SCN value relieves the need to calculate and catalog every single prior transaction that it is dependent upon. Instead, it can be presumed that transaction TXC is dependent upon every transaction having a SCN of 10 or less. Thus, when ordering transactions, TXC is always placed later than any transactions having a SCN of 10 or less. In other words, transaction TXC is not executed unless all transactions having an SCN of 10 or less has already been processed and committed.

According to the invention, SCNs are increasing values that represent a natural ordering of transactions. A later committing transaction will have a higher SCN than an earlier committing transaction. If transaction TXC is dependent upon a prior transaction TXA having a given commit time t, then TXC is presumed to be dependent upon every other transaction equal to or earlier than commit time t. There is no need to calculate and determine the even earlier dependencies of transaction TXA, since it can be presumed that any such dependencies are earlier then the commit time t of transaction TXA. To ensure that all dependencies of a transaction are considered, the dep_SCN value uses the maximum commit time value for all of the transactions that it is dependent upon. This collapses the entire set of dependencies for a transaction into a single dep_SCN value.

Consistent with the invention, dep_SCN values are calculated based upon changes at the granularity level of the table row. To accomplish this type of dependency tracking at the row level, disclosed is a database structure that can be used to track the commit times associated with changes to each row of the database. As used herein, the commit time for a change to a database row is referred to a "row_SCN". Dependency tracking can therefore be performed at low granularity levels, since commit times are tracked at the row level. Thus, dep_SCN values are calculated based upon changes to rows (or combination of rows), rather than at coarser granularity levels such as the block level.

One implementation of the invention adds a structure to each row that is capable of holding a row_SCN value associated with each row (e.g., by adding to the head piece of a table row). This new structure comprises an additional column (whether hidden or visible to users) that is capable of storing one or more row_SCN values corresponding to that row. According to an embodiment, if a transaction affects a row, then the commit time of that transaction becomes the row_SCN value for that row. If a transaction affects multiple rows during the course of its processing, then the row_SCN for all the affected rows is the same (which constitutes the SCN of the common transaction).

The calculation of a dep_SCN value at row level granularities can be determined based upon the row_SCN values of the rows affected by a particular transaction. In an embodiment, the dep_SCN value at row level granularities for a transaction TRX is determined as follows:

dep_SCN=MAX(row_SCN of all rows affected by TRX)

For the purposes of illustration, consider the following sequence of transactions which executes the indicated database statements (in SQL-based pseudocode) against a database table "Emp_Table" having the structure Emp_Table (emp_name, emp_value):

At commit time 5—Transaction T1 commits having executed the following statement:
INSERT INTO Emp_Table VALUES ('Smith', X);

At commit time 10—Transaction T2 commits having executed the following statement:
INSERT INTO Emp_Table VALUES ('Jones', Y);

At commit time 15—Transaction T3 commits having executed the following statements:
UPDATE Emp_Table SET Emp_value=X+1 WHERE emp_name='Smith';
UPDATE Emp_Table SET Emp_value=Y+1 WHERE emp_name='Jones';

At commit time 20—Transaction T4 commits having executed the following statement:
INSERT INTO Emp_Table VALUES ('Miller', Z);

At commit time 25—Transaction T5 commits having executed the following statements:
UPDATE Emp_Table SET Emp_value=Emp_value +1 WHERE emp_name='Smith';
DELETE FROM Emp_Table WHERE emp_name= 'Miller';

At commit time 5, transaction T1 commits having inserted a row into the table Emp_Table, with the value "Smith" in the emp_name column of that row and the value "X" in the emp_value column of that row. At commit time 10, transaction T2 commits having inserted a row into the table Emp_Table, with the value "Jones" in the emp_name column of that row and the value "Y" in the emp_value column of that row. At commit time 15, transaction T3 commits which modifies the "Smith" row to change the emp_value column of the row to "X+1". Transaction T3 also modifies the "Jones" row to change the emp_value column of the row to "Y+1". At commit time 20, transaction T4 commits which has inserted a row into the table Emp_Table, with the value "Miller" in the emp_name column of that row and the value "Z" in the emp_value column of that row. At commit time 25, transaction T5 commits which modifies the "Smith" row to change the emp_value column of the row to "X+2". Transaction T5 also deletes the "Miller" row that was inserted by transaction T4.

Figure 2:
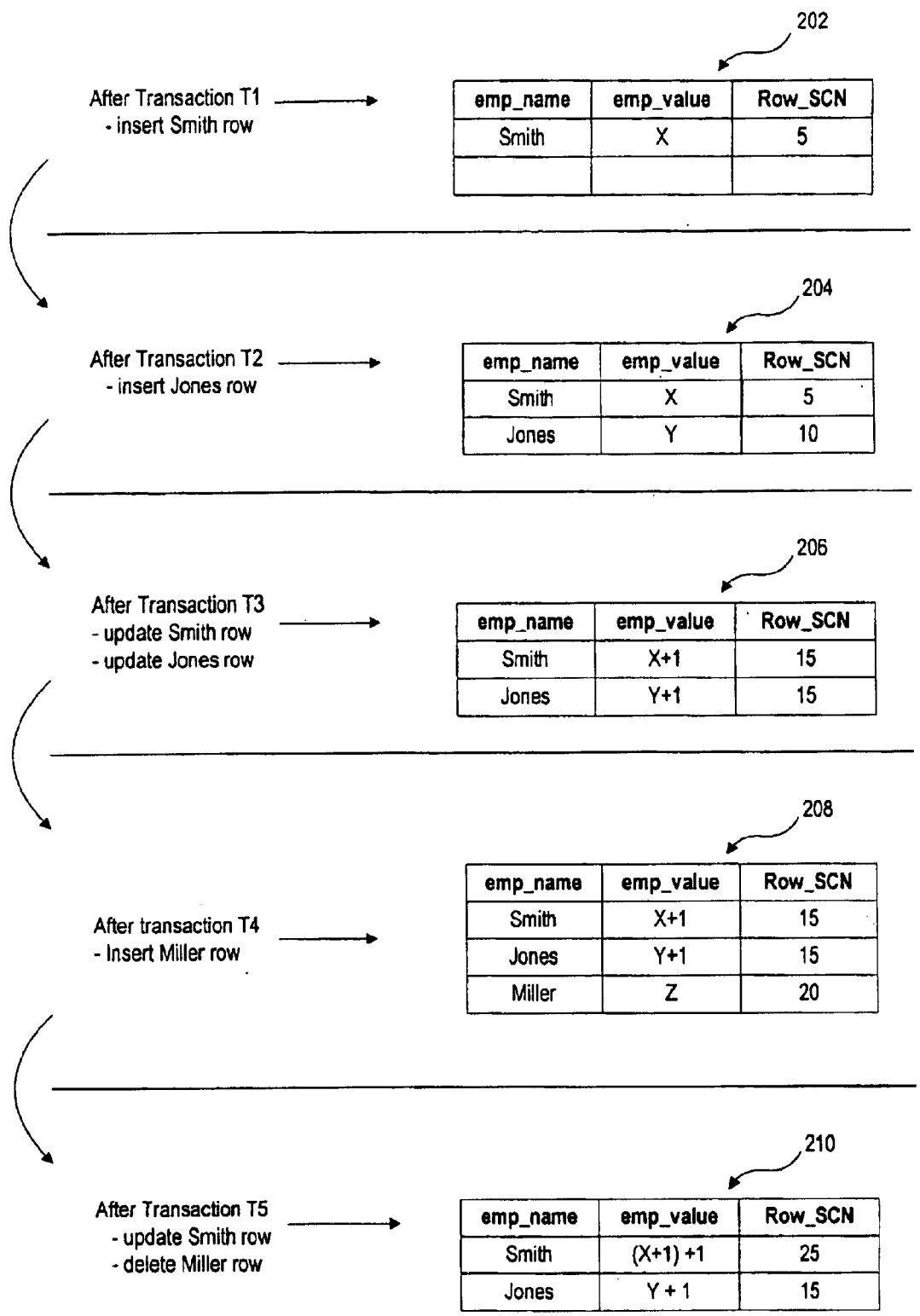
FIG. 2 depicts changes to a database table as an example sequence of database statements are applied.

With respect to the above example sequence of transactions T1–T5, FIGS. 2 and 3 illustrate the application of this embodiment of the invention. FIG. 2 illustrates changes to the Emp_Table as the sequence of transactions T1–T5 are performed and committed. FIG. 3 describes the calculation of dep_SCN values at row level granularities for each of the transactions T1 through T5.

Note that in this example, transaction T1 commits at commit time 5 having executed the following statement:
INSERT INTO Emp_Table VALUES ('Smith', X);

Since this transaction consists of an INSERT statement, it is not dependent upon any other transaction. Thus, the dep_SCN value for any rows affected by this transaction is set to a value that indicates no dependencies, which is equal to "0" in the present embodiment. The row-based commit time for all rows affected by this transaction is 5, which is the commit time of the transaction. Dependent SCN Table 300 in FIG. 3 is used to demonstrate the tracking of dep_SCN values. Row 302 in the Dependent SCN Table 300 shows, in the dep_SCN column 312, that the dep_SCN for transaction T1 has been set to "0". Table 202 in FIG. 2 illustrates the Emp_Table after transaction T1 has committed. Transaction T1 inserts a new "Smith" row to table Emp_Table, with the value "Smith" in the emp_name column and "X" in the emp_value column of the new row. Since the present embodiment of the invention tracks dependencies at the granularity of the row level, the "Smith" row also includes a row_SCN value of "5", which is the commit time of transaction T1.

Structures in FIGS. 2 and 3 are shown for purposes of illustration only, to help illustrate the changes to the dep_SCN value and row_SCN values as transactions T1 through T5 are executed. It is understood, however, that the choice of storage locations and format for these commit time values are subject to many design variables and may be stored in numerous locations or formats; thus, the exact storage locations and format shown for these commit time values do not form a necessary limitation to the invention.

In a similar manner to transaction T1, transaction T2 having a commit time of 10 executes the following statement:
INSERT INTO Emp_Table VALUES ('Jones', Y);

Table 204 in FIG. 2 illustrates Emp_Table after transaction T2 has committed. Similar to transaction T1, T2 inserts a new row into Emp_Table having the "Jones" and "Y" values in the emp_name and emp_value columns, respectively. The row_SCN value for any row affected by T2, including the new "Jones" row, is 10, which is the commit time of transaction T2. Since this transaction executes an insert statement, it is not dependent upon any previous transactions; thus, the dep_SCN for the inserted row has a value of "0". This is the same dep_SCN as the "Smith" row, even though the row_SCN associated with the "Jones" row is higher than the row_SCN of the "Smith" row. Therefore, despite their row_SCN values, it can be seen that neither row is dependent upon the other, and can be ordered entirely independent of the other. The dependent commit time value for rows affected by transaction T2 are shown in row 304 of FIG. 3.

Transaction T3 commits at time 15 having executed the following statements:
UPDATE Emp_Table SET Emp_value=X+1 WHERE emp_name='Smith';
UPDATE Emp_Table SET Emp_value=Y+1 WHERE emp_name='Jones';

According to an embodiment, the dep_SCN value for this transaction is calculated by determining the maximum of the row_SCN values for all rows that it affects. Since T3 directly affects the "Smith" and "Jones" rows, the dep_SCN for transaction T3 is:

dep_SCN of T3=MAX(row_SCNs of all rows affected by T3)=MAX(row_SCN of "Smith" row, row_SCN of "Jones" row)=MAX(5, 10)=10

Thus, row 306 of the Dependent SCN Table 300 in FIG. 3 shows that the dep_SCN of transaction T3 is 10. Since transaction T3 commits at commit time 15, all rows affected by this transaction has a new row_SCN of "15". Table 206 in FIG. 2 reflects the state of table Emp_Table after transaction T3 has committed, including an update to the row_SCN value for each row modified by T3.

In a similar manner to transactions T1 and T2, transaction T3 having a commit time of 20 executes the following statement:
INSERT INTO Emp_Table VALUES ('Miller', Z);

Table 208 in FIG. 2 illustrates Emp_Table after transaction T4 has committed. Similar to transactions T1 and T2, T4 inserts a new row into Emp_Table having the "Miller" and "Z" values in the emp_name and emp_value columns, respectively. The row_SCN value for any row affected by T2, including the new "Miller" row, is 20, which is the commit time of transaction T4. Since this transaction executes an insert statement, it is not dependent upon any previous transactions; thus, the dep_SCN for the inserted row has a value of "0", which is the same dep_SCN as the rows inserted by transactions T1 and T2. The dep_SCN value for rows affected by transaction T4 is shown in row 308 of FIG. 3.

Transaction T5 commits at time 25 having executed the following statements:

UPDATE Emp_Table SET Emp_value=Emp_value+1 WHERE emp_name='Smith';

DELETE FROM Emp_Table WHERE emp_name='Miller';

Transaction T5 is dependent upon all prior transactions T1–T4 since it modifies rows affected by these prior transactions. However, it is directly dependent upon transactions T3 and T4 (as seen from FIG. 1), since it directly modifies or deletes rows last affected by these transactions. The dep_SCN for transaction T5 is therefore:

dep_SCN of T5=MAX(row_SCNs of all rows directly affected by T5)=MAX(row_SCN of "Smith" row, row_SCN of "Miller" row)=MAX(15, 20)=20

As shown in row 310 of the Dependent SCN Table 300, the dep_SCN of transaction T5 is 20. Since transaction T5 has a commit time of 25, all rows affected by T5 that still exist have a new row_SCN equal to "25". Table 206 in FIG. 2 reflects the state of table Emp_Table after transaction T5 has committed, including an update to the row_SCN value for each row modified by T5.

Figure 4:
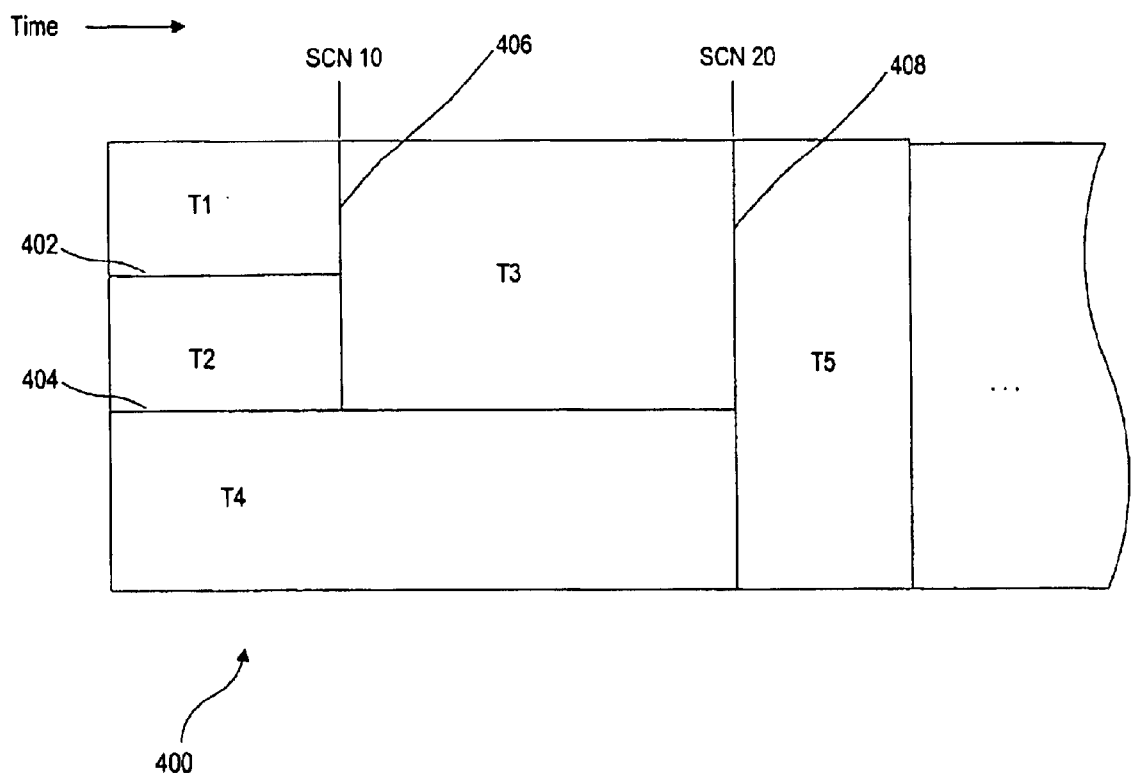
FIG. 4 shows a scheduling plan corresponding to the transactions of FIG. 2–3.

The dependency ordering of transactions can be established once the dep_SCN for transactions have been determined. FIG. 4 illustrates an ordering schedule for transactions T1–T5 based upon the analysis of dep_SCNs as shown in FIG. 3. In FIG. 4, the ordering schedule proceeds from left to right, with required ordering of transactions indicated by vertical bars between transactions. Transactions that are permitted to run in parallel or earlier than each other (i.e., are not dependent upon each other) are separated by horizontal bars. Since transactions T1, T2, and T4 all have the same dependent SCN of "0", these transactions are not dependent upon any earlier transactions, and can be ordered before or parallel to any other transaction subject to the ordering/ dependency constraints of any later transactions. Thus, these three transactions are configured in parallel separated by horizontal bars 402 and 404.

Transaction T3 has a dep_SCN value of 10; therefore, T3 must be scheduled to begin after all other transactions having SCN values of 10 or less. Vertical bar 406 representing a SCN of 10 is shown in ordering schedule 400 separating transaction T3 from all prior transactions having a SCN of 10 or less (transactions T1 and T2 in this example have SCN values of 10 or less). Since transaction T4 has a SCN higher than 10, transaction T3 is permitted to run in parallel with T4 (shown separated with horizontal bar 404). Transaction T5 has a dep_SCN value of 20; therefore, T5 must be scheduled to begin after all other transactions having SCN values of 20 or less. Thus, vertical bar 408 representing a SCN of 20 in ordering schedule 400 separates T5 from all prior transactions having a SCN of 20 or less.

To rephrase the significance of FIG. 4, the dep_SCN values for each transaction has been used to provide a scheduling order for the application of each transaction T1–T5. Since the dep_SCN values were calculated upon SCN values stored for reach row, the granularity of the dependency tracking used for the scheduling order is on the row level. Based upon analysis of the dep_SCN values, it can be seen that transactions T1, T2, and T3 can each be scheduled independent of the other, and even scheduled in parallel. Transaction T3 must be scheduled after transactions T1 and T2 have committed, but may be scheduled in parallel with transaction T4. And finally, transaction T5 must be scheduled after all other transactions T1–T4 have committed.

FIG. 1 maps the tree of dependencies for these transactions, which is an alternate method of representing FIG. 4. Since transaction T3 can be applied only if transactions T1 and T2 have already been committed. Node T3 is shown as a child to parent nodes T1 and T2. Transaction T5 is dependent upon all the other transactions since it is modifying or deleting rows in a manner that relies upon actions that have previously been taken by transactions T1–T4. Transaction T5 is directly dependent upon transaction T4 since transaction T5 is deleting the "Miller" row, which exists only if transaction T4 has been executed and committed. Thus, T5 is shown as a child node to node T4. Transaction T5 is dependent upon transaction T3 since transaction T5 is updating the "Smith" row in a manner that relies upon the prior update made by transaction T3. Node T5 is therefore also shown as a child node to T3. Since transaction T3 is dependent upon transactions T1 and T2, then through T3, transaction T5 is also dependent upon transactions T1 and T2. Transactions T1, T2, and T4 do not rely upon actions taken by any previous transactions. Therefore, these nodes are shown without any parent nodes.

Figure 5:
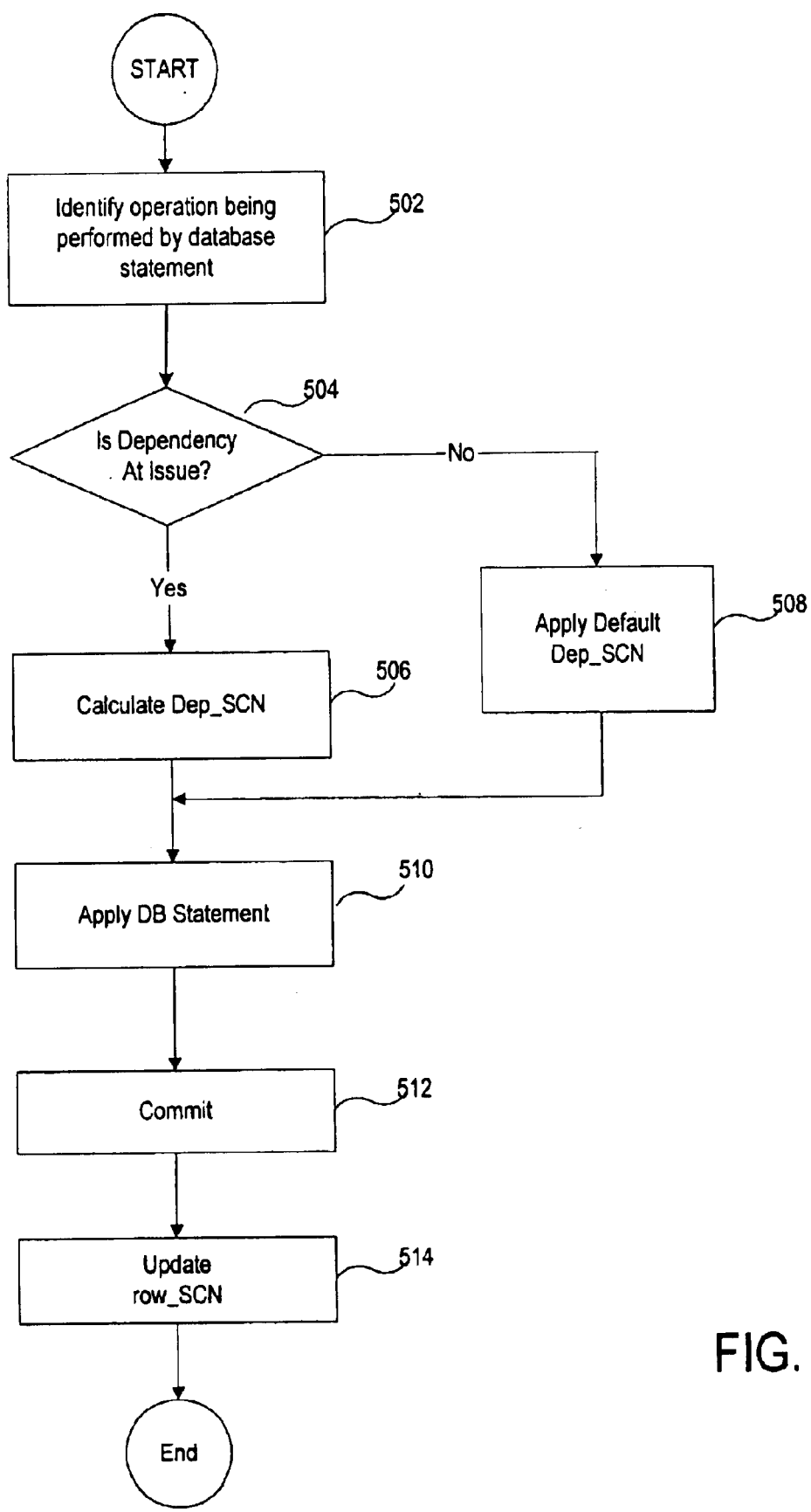
FIG. 5 shows a process flowchart of an embodiment of the invention.

FIG. 5 depicts a flowchart of a process for dependency tracking according to an embodiment of the present invention. At 502, identification is made of the particular operation being performed by a database statement. According to an embodiment, dependency tracking can be made at the operation level, with certain kinds of data operations having dependency significance that is different than other kinds of data operations. Consistent with this embodiment, the following are examples of operations along with their dependency significance:

a. Insert operation: This operation is not dependent any prior operations; therefore, insert operations result in a default dep_SCN value for inserted rows to reflect no dependencies.

b. Query operation: For systems that do not replicate queries, this operation does not cause any dependencies to occur, therefore does not affect a row_SCN. If queries are replicated, e.g., in a system having operation or function replication in addition to data replication, then query operations could be dependent upon prior changes made to a row value; therefore, need to calculate a dep_SCN.

c. Update operation: Update operations are dependent upon prior insertions and changes made to row values; therefore, need to calculate dep_SCN.

d. Delete operation: Delete operations are dependent upon prior insertion of a row; therefore, need to calculate dep_SCN.

e. Physical property changes: In the present embodiment, physical characteristics of a data object, e.g., the specific block that an object is stored in, do not cause dependencies.

At 504, the type of operation being performed by a statement is considered in determining the dep_SCN calculation. If the operation has no dependencies (e.g., INSERT statement), then a default value is assigned to the dep_SCN indicating no dependencies (508). Otherwise, a dependency calculation is performed to determine the dependent SCN for a transaction (506). The dep_SCN value may be obtained by taking the maximum value for all the row_SCNs affected (either directly or indirectly) by the transaction. The database statement can thereafter be applied (510) and the transaction committed (512).

According to an embodiment of the invention, the row_SCN value is stored in a head piece that is added to a table row. This portion of the row can be considered a "hidden" column that stores information that is internally usable by the database system. When the row is not locked by a transaction, this row_SCN holds the commit time of the transaction that last modified the row. When a row is marked as locked, the row_SCN could be stored in a lock structure, and is configured to store the commit time of the last modifier of the row. If there is no row_SCN value in the lock structure, the transaction may be active so the row_SCN in the row may be employed for dep_SCN calculations. When a new row is inserted into a table, the row_SCN of that row is the commit time of the transaction that performed the insert operation and the dep_SCN value is initialized to zero.

According to an embodiment, the commit of a transaction does not automatically cause the row_SCN of a row to be updated with the commit time of the transaction. Instead, a delayed logging cleanout operation is performed that does not propagate the commit time to each affected row. According to this embodiment, a lock on a row is not automatically released once a transaction commits. Instead, the lock is cleaned out "on-demand" when a later transaction is interested in taking a lock to that row. Only at that later point in time, when the lock is cleared out for a particular row, is the row_SCN for that row updated with the commit time of the last transaction that has operated upon the row and committed (514). That same commit time is copied to the row_SCN for all rows affected by that previous transaction. In an alternate embodiment, the row_SCN of a row is updated as soon as the transaction operating upon that row commits, without waiting for a later transaction to clean out the locks.

This invention can be utilized to implement scalable replication in a database system. Replication is the process of copying and maintaining database objects such that information at a local database is replicated to a remote database. Many advantages exist to having a replicated database system. For example, replication can improve the performance and protect the availability of applications because of the existence of alternate data access sites. An application may normally access a local database rather than a remote server to minimize network traffic and achieve maximum performance.

Consider a replication system that operates by propagating all changes at a local database to remote database sites. The changes are then applied at the remote sites to maintain correspondence between the state of the remote database and the state of the local database. As changes are performed to the local database site, the changes are queued for transmission to the remote sites. Under certain circumstances, it may be desirable to transmit these changes out-of-order to the remote sites, possibly to maximize network bandwidth usage by transmitting various changes in parallel. With the present invention, the type of scheduling plan as represented in FIG. 4 can be utilized to determine which changes can be transmitted in parallel without violating dependencies between the changes. If the unit of change utilized is the transaction, then the present invention can be used to determine the order in which transactions can be propagated and applied at remote site in a replicated system. Alternatively, the transactions themselves can be propagated in any contemplated order necessary to minimize network usage, but once the changes have actually been received by the remote sites, a scheduling plan may be used to re-apply the changes in the correct order at the remote sites.

Replication is merely one example of a procedure in which the present invention may be applied. The present method and mechanism for dependency tracking can also be utilized for improved optimistic locking. With optimistic locking, data items accessed and retrieved by a first user are not immediately placed in an exclusive lock with respect to other users. This allows greater concurrency in the system since other users are not blocked from simultaneous access to that data item. However, this may also allow other users to independently modify that data item after a version of the data item has been retrieved by the first user, thereby rendering the copy of the data item held by the first user invalid or "stale".

According to the present invention, the row_SCN value associated with a row in the database can be utilized to determine whether a data item has been modified by another user. When the first user is ready to act upon a data item (e.g., a "modify" operation), the row_SCN value(s) for that data item is checked to determine whether the data item has been modified after the original retrieval time by the first user. If the row_SCN value(s) is more recent than the SCN corresponding to the original retrieval time, then another user has modified that data item and the first user must obtain the most recent version of the data item before proceeding. If the row_SCN values(s) is equal or less than the original retrieval time by the first user, this indicates that another user did not recently modify the data item and the planned operation can proceed without worry of data inconsistency.

As another example, the present invention can also be used for improved data caching to more efficiently identify stale data items in cache. Row_SCN values for data items in cache can be checked to determine whether the data versions in cache accurately reflect the most recent changes to those data items. According to an embodiment, the data cache is associated with a cache SCN value corresponding to the last point in time in which the data cache was updated with the most recent versions of data items maintained in that cache. At a later point in time, the row_SCN values for data items in cache are matched against the cache SCN. If the row_SCN value for a data item is less than or equal to the cache SCN, then that data item did not change and the cache contains the latest version of that data item. If the row_SCN value for a data item is greater than the cache SCN, then the cache does not contain the most recent version of that data item and should be updated to become current. Once the updates for all data items have completed, the cache SCN value is updated to reflect the SCN at which the cache refresh operation occurred. Note that this operation can be performed periodically to ensure that the recent versions of data items are maintained in cache. This operation can also be performed upon access to a particular data item in cache.

Unique Dependency Constraint Tracking

A uniqueness constraint in a relational database table requires that every value in a column or set of columns to be unique, in which no two rows of a table have duplicate entries in the specified column or set of columns. According to an embodiment of the invention, the above mechanism for row-level dependency tracking can be utilized to track dependencies for some operations performed upon rows having a uniqueness constraint. For example, the dependency between a first data operation that inserts a row and a subsequent data operation that deletes or modifies that same row can be captured using row-level dependency tracking as described with respect to FIGS. 1–5.

However, consider the situation in which a first operation deletes a row from a table, and a second operation subsequently inserts another (and different) row into the table having the same value in a uniqueness constrained column. The second operation is therefore dependent upon the execution and completion of the first operation; otherwise, there would be two rows in the table having the same key value in the constrained column, which would violate the uniqueness constraint upon the column. In this situation, row-level dependency tracking may return false dependency information because the first and second data operations act upon different rows.

To address this problem, the present invention provides a method and mechanism to track changes made to particular ranges of keys in uniqueness constrained columns, rather than to just specific rows or sets of rows in a table. According to the present invention, each constrained column is represented as a set of key ranges, with each key range associated with one or more possible key values for the column. For each key range, a data structure is maintained to track the commit time of the last delete operation performed against a key value within the corresponding key range. This data structure is referred to herein as the last delete SCN or "LD_SCN".

Each time a row having a key value is deleted from a constrained table, the LD_SCN associated with the key range corresponding to the deleted key value is updated with the commit time of the data operation that deleted the row. To ensure that subsequent insert operations for rows having a key value within that key range do not violate uniqueness constraints, those later insert operations are considered to have dependencies upon prior data operations with commit times at or earlier than the value represented in the LD_SCN. Therefore, the dependent SCN value for a data operation that inserts a key value into a constrained table is the LD_SCN of the corresponding key range for that key value. This causes the later insert operation to be properly ordered with respect to earlier delete operations against a particular key range, which prevents an insert of a key value from occurring before the prior delete of that same key value from a constrained table. When ordering or scheduling data operations, the insert operation is scheduled after the completion and commit of prior data operations having a commit time equal to or lower than the LD_SCN value, but can be scheduled in parallel or before other data operations having a commit time higher than the LD_SCN value. The granularity of the dependency tracking can be adjusted based the size of the key ranges associated with each LD_SCN value.

Figure 6B:
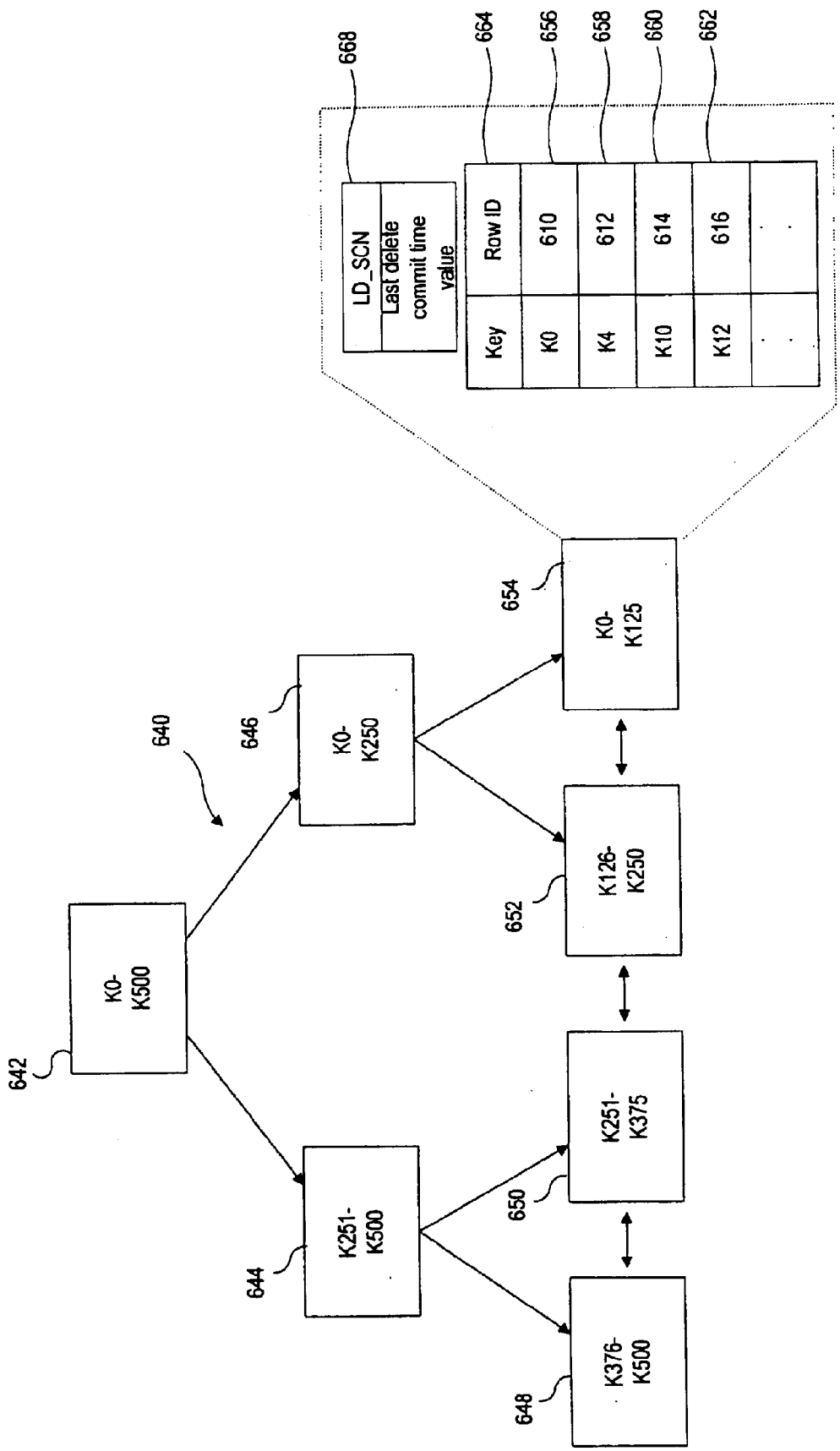

To illustrate an implementation of the invention, shown in FIG. 6A is a table 600 having a uniqueness constrained column 602. No row in table 600 can have a key value in column 602 that duplicates the key value in that column for any other row. One approach to implementing uniqueness constraints is to associate an index with the column or set of columns that needs to be unique. An index provides an efficient mechanism for verifying the uniqueness of key values in constrained column(s). FIG. 6B shows an example index 640 that corresponds to the constrained column 602 in table 600. Index 640 represents the internal structure of a B*-Tree index. Note that this type of index is shown for illustrative purposes only; other types of index structures can also be used in conjunction with the invention.

The upper levels (branch blocks 642, 644, and 646) of index 600 contain index data that point to the lower level index blocks (leaf blocks 648, 650, 652, 654). Each of the leaf blocks contains indexed key values corresponding to rowid identifiers that point to the particular row in table 600 containing that key value. For example, leaf block 654 contains the rowid identifiers for all rows in the key range K0–K125. Thus, any row in table 600 having a key value in column 602 within this range is associated with an entry in leaf block 654. Leaf block structure 664 in leaf block 654 represents a mapping between key values and rowid identifiers for each row having a key value in column 602 within the key range K–K125. Thus, row 656 in leaf block structure 664 corresponds to a key value of K0, which is present in table 600 at row 610. Similarly, key value K4 is located at row 612, key value K10 at row 614, and key value K12 at row 616 in table 600. For a unique index, there should be one rowid identifier per key value in index 640.

Uniqueness constraints can be enforced by checking index 640 when a new row is inserted into table 600. Each time a new row is inserted, the key value of column 602 for the new row is checked against the values in the appropriate key range leaf blocks in index 640. If the key value already exists in the index, then the new row violates the uniqueness constraint on column 602, and cannot be added to table 600. If the key value does not exist, then the new row is inserted into table 600 and index 604 is updated in the appropriate leaf block to reflect that the key value now exists in table 600.

Consistent with an embodiment of the invention, each key range/index block is associated with an LD_SCN data structure 668 that holds the commit time of the last data change or transaction that deleted a key value from its respective key range. According to an embodiment of the invention, the LD_SCN data structure 668 is located in the same index block as the information for its corresponding key range. Each time a row is deleted from table 600, the corresponding key value for that deleted row is deleted from the appropriate index leaf block in index 640. This delete operation also updates the LD_SCN value 668 with the commit time of the operation or transaction that deleted the row in table 600. If a transaction deletes multiple rows, then the LD_SCN for all key ranges of deleted rows is updated with the same commit time of the transaction. Any subsequent insert operation against these same key ranges, whether inserting the same key values or not, will retrieve the LD_SCN value and utilize that value as its dependent SCN value.

According to an embodiment of the invention, since the commit time of the database system is an increasing value for which a later committed data change has a higher value than an earlier committed data change, the LD_SCN values also monotonically increases over the life of an index. In an embodiment, when an index is created, the LD_SCN of the index block(s) is set to the SCN of the creation of the index. As stated above, the LD_SCN is updated with the commit time of the transaction that deletes a key from the index. The moment at which the LD_SCN is updated depends upon the particular implementation of the system to which the invention is directed. As with the row-level dependency tracking mechanism discussed above, a delayed cleanout process can be employed to delay an update of an LD_SCN value until a later transaction wishes to lock the corresponding index block. The LD_SCN value may also be immediately updated when a transaction deletes a key from the index.

The present embodiment also addresses index leaf splits and index leaf coalesce events. When an index leaf is split into multiple leaf blocks, the LD_SCN value of the original leaf block is copied to each of the new leaf block(s) resulting from the split. When two index leaf blocks coalesce (i.e., merge into a single leaf block), the LD_SCN of the resulting leaf block is set to the larger of the LD_SCNs of the original leaf blocks before the merge.

Note that the basis of this aspect of the present invention is an association between an LD_SCN value and a particular key range, and is not reliant upon any particular index structure or index block structure. While the presently disclosed embodiment associates an LD_SCN with each separate index block, it is noted that multiple LD_SCN values can be associated with subset key ranges within an index block, a single LD_SCN can be associated with a multiple index blocks, or other permutations of such LD_SCN associations consistent with the principles of the invention. Indeed, the present invention can be employed even without an index, in which a LD_SCN value is associated with a key value range for a constrained column for which a non-index mechanism is employed to enforce uniqueness constraints upon that column.

For purposes of tracking dependencies for transactions against a constrained table, dependent SCN ("dep_SCN") values can be calculated based upon either LD_SCN values or row_SCN values, depending upon the particular data operation that is being performed. A combination of either or both LD_SCN and row_SCN values are employed since exclusive reliance upon either could result in false dependency determinations. If a column of the table is uniqueness constrained, then basing the dep_SCN determination solely upon row_SCN values could lead to incorrect dep_SCN values, since a later insert operation may insert an key values into new and different rows of a table.

According to an embodiment of the invention, when determining dependencies for a transaction that modifies or deletes a row from a uniqueness constrained table, the dep_SCN of the transaction is determined as follows:

Dep_SCN=max(row_SCNs of all rows deleted/modified by transaction)

When determining dependencies for a transaction that only inserts rows into a uniqueness constrained table, the LD_SCN value for the appropriate key range is utilized to determine the dep_SCN of the transaction. In an embodiment, the dep_SCN of the transaction is determined as follows:

Dep_SCN=max(LD_SCN of all key ranges for rows inserted by transaction)

When determining dependencies for a transaction that inserts AND deletes/modifies rows from a uniqueness constrained table, the dep_SCN of the transaction is determined as follows:

Dep_SCN=max(max(LD_SCN of all key ranges for rows inserted by transaction), max(row_SCNs of all rows deleted/modified by transaction))

This statement is also used to determine dependencies for a transaction that updates a uniqueness constrained value in a row, in which such an update operation is operationally equivalent to a delete of the existing row and an insert of an entirely new row having the new (updated) value in the uniqueness constrained column.

As an illustrated example, consider the following sequence of transactions which executes the indicated database statements (in SQL-based pseudocode) against a database table "Dept_Table" having the structure Dept_Table (Dept_name, Dept_state):

At commit time 5—Transaction TXA commits having executed the following statement:

INSERT INTO Dept_Table VALUES ('finance', 'NY');
INSERT INTO Dept_Table VALUES ('legal', 'CA');
INSERT INTO Dept_Table VALUES ('sales', 'MI');

At commit time 10—Transaction TXB commits having executed the following

Figure 7:
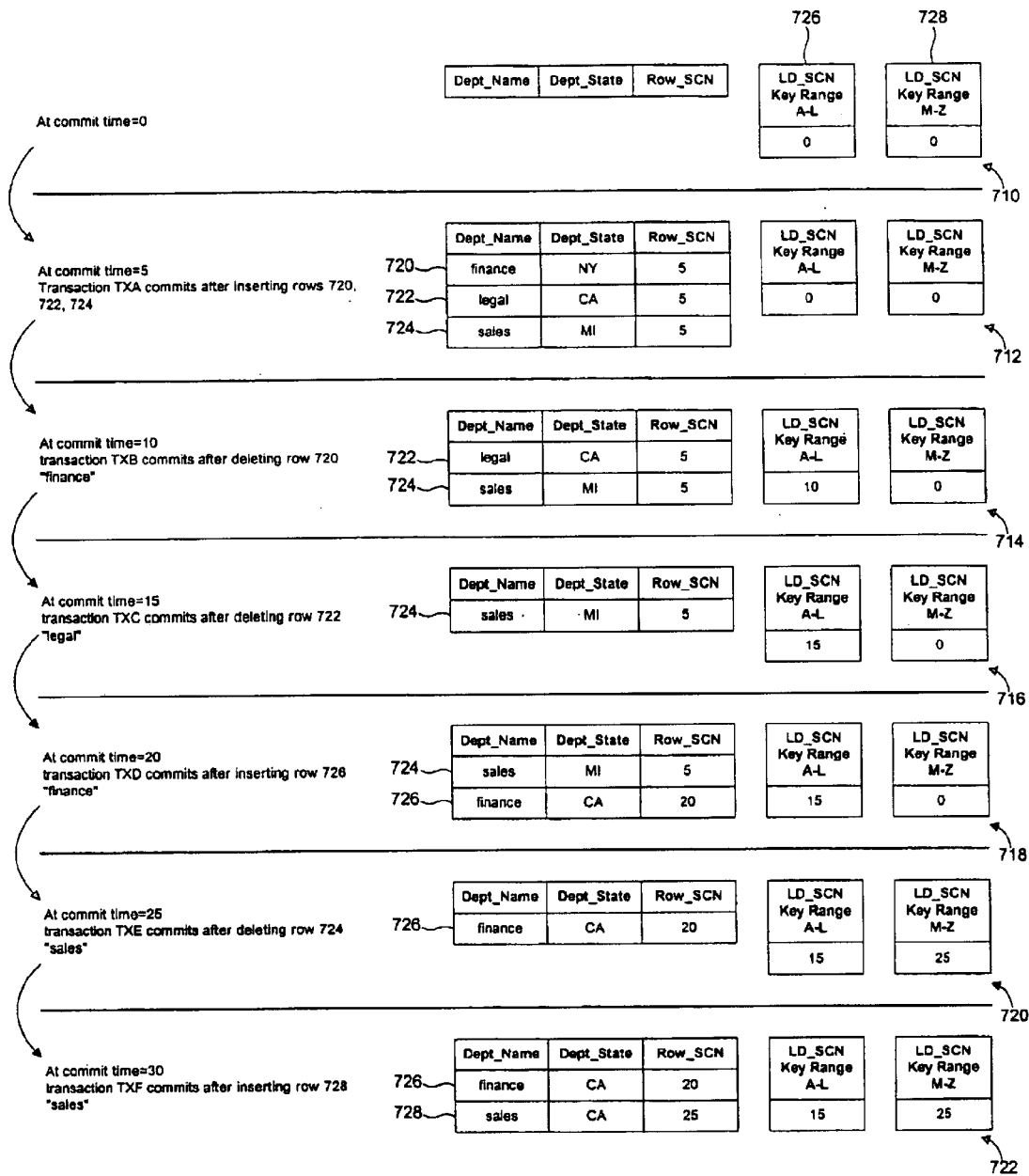
FIG. 7 depicts changes to a database table and associated LD_SCN data structures as an example sequence of database statements are applied.

DELETE FROM Dept_Table WHERE Dept_name= 'finance';

At commit time 15—Transaction TXC commits having executed the following statements:

DELETE FROM Dept_Table WHERE Dept_name= 'legal';

At commit time 20—Transaction TXD commits having executed the following statement:

INSERT INTO Dept_Table VALUES ('finance', 'CA');

At commit time 25—Transaction TXE commits having executed the following statements:

DELETE FROM Dept_Table WHERE Dept_name= 'sales';

At commit time 30—Transaction TXF commits having executed the following statement:

INSERT INTO Dept_Table VALUES ('sales', 'CA');

With respect to the above example sequence of transactions TXA–TXF, FIGS. 7 and 8 illustrate the application of this embodiment of the invention. FIG. 7 illustrates changes to the Dept_Table and LD_SCN values for corresponding key ranges as the sequence of transactions is performed and committed. FIG. 8 describes the calculation of dependent SCN values for each of the transactions TXA through TXF.

For the purposes of this example, assume that the Dept_Name column of Dept_Table is a uniqueness constrained column and that two key ranges are initially associated with the Dept_Name column, with a first key range for key values beginning with the letters A–L and a second key range for key values beginning with the letters L–Z. Further assume that Dept_Table was created by a transaction that committed at commit time 0. Referring to FIG. 7, the Dept_Table (which is empty at time=0) is shown at section 710 along with initial values of "0" for LD_SCN key range 726 and LD_SCN key range 728. The Dept_Table is also shown having a row_SCN column to track row-level dependencies for changes to rows in the table.

Recall that in this example, transaction TXA commits at commit time 5 having executed the following statements:

INSERT INTO Dept_Table VALUES ('finance', 'NY');
INSERT INTO Dept_Table VALUES ('legal', 'CA');
INSERT INTO Dept_Table VALUES ('sales', 'MI');

Section 712 of FIG. 7 shows the Dept Table after TXA has performed these insert operations and committed. Note that the row_SCN values for each row is updated to reflect the commit time of TXA. The LD_SCN values for each key range has not been modified, since no delete operations were performed against the Dept_Table.

Here, TXA performs insert operations against multiple key ranges (i.e., key ranges A–L and M–Z); therefore, the dep_SCN of TXA is the maximum of the LD_SCN values for each of the key ranges affected by the transaction. Thus, the dep_SCN of TXA is the following:

Dep_SCN=max(LD_SCN for key range A–L, LD_SCN for key range M–Z)=max(0,0)=0

This transaction has a dep_SCN value that is set to a value that indicates no dependencies, which is equal to "0" in the present embodiment. The row-based commit time for all rows affected by this transaction is 5, which is the commit time of the transaction. Dependent SCN Table 800 in FIG. 8 is used to demonstrate the tracking of dep_SCN values.

Row 802 in the Dependent SCN Table 300 shows that the dep_SCN for transaction TXA has been set to "0".

It is appropriate to note that the structures shown in FIGS. 7 and 8 are displayed for purposes of illustration only, to help illustrate the changes to the dep_SCN, LD_SCN, and row_SCN values as transactions TXA through TXF are executed. It is understood, however, that the choice of storage locations and format for these commit time values are subject to many design variables and may be stored in numerous locations or formats; thus, the exact storage locations and format shown for these commit time values do not form a necessary limitation to the invention.

Transaction TXB having a commit time of 10 executes the following statement:

DELETE FROM Dept_Table WHERE Dept_name= 'finance';

Section 714 in FIG. 7 illustrates Dept_Table after transaction TXB executes this statement and commits. In particular, transaction TXB deletes the "finance" row from the Dept_Table (i.e., row 720). Since this row no longer exists, the row_SCN value for this row is not updated with the commit time of TXB. However, the LD_SCN for the key range affected by this delete statement is updated to reflect the commit time for TXB. Specifically, the LD_SCN 726 for key range A–L is updated to include the value "10", which is the commit time of TXB.

Since transaction TXB has deleted a row from the table, the dep_SCN of this transaction is determined by taking the maximum of the row_SCN value of each row deleted by TXB, which is determined as follows:

Dep_SCN=max(row_SCN of row "finance")=5

Thus, transaction TXB is considered to be dependent upon each prior transaction having a commit time of 5 or less. Row 804 in the dependent SCN table 800 of FIG. 8 is updated to reflect this dep_SCN value for TXB.

Transaction TXC commits at time 15 having executed the following statement:

DELETE FROM Dept_Tabled WHERE Dept_name= 'legal';

Similar to TXB, transaction TXC deletes a row from the Dept_Table in which the deleted row is the "legal" department row. Section 716 in FIG. 7 illustrates the Dept_Table after transaction TXC executes this statement and commits. In particular, transaction TXC deletes the "legal" row from the Dept Table (i.e., row 722). Since this row no longer exists, the row_SCN value for this row is not updated with the commit time of TXC. However, the LD_SCN for the key range affected by this delete statement is updated to reflect the commit time for TXC. Specifically, the LD_SCN 726 for key range A–L is updated to include the value "15", which is the commit time of TXC.

Since transaction TXC has deleted a row from the table, the dep_SCN of this transaction is determined by taking the maximum of the row_SCN value of each row deleted by TXC, which is determined as follows:

Dep_SCN=max(row_SCN of row "legal")=5

Thus, transaction TXC is considered to be dependent upon each prior transaction having a commit time of 5 or less. Row 806 in the dependent SCN table 800 of FIG. 8 is updated to reflect this dep_SCN value for TXC.

Transaction TXD having a commit time of 20 executes the following statement:

INSERT INTO Dept_Table VALUES('finance', 'CA');

Section 718 in FIG. 7 illustrates the Dept_Table after transaction TXD executes this statement and commits. In particular, transaction TXD inserts a new "finance" row into the Dept_Table (i.e., row 726). The row_SCN value for this new row 726 is updated with the commit time of TXD. However, the LD_SCN for the key range affected by this transaction is not updated, since TXD has not deleted any rows. Note that the new row 726 is not the same row as the previously deleted "finance" row 720, even though both rows contain the same key value in the constrained column. Thus, the LD_SCN value of the key range for the newly inserted row is used to determine the dep_SCN value of the transaction:

Dep_SCN=max(LD_SCN of key range for rows inserted by TXD)=max(LD_SCN of key range A–L)= 15

Thus, transaction TXD is considered to be dependent upon each prior transaction having a commit time of 15 or less. Row 808 in the dependent SCN table 800 of FIG. 8 is updated to reflect this dep_SCN value for TXD.

Transaction TXE commits at time 25 having executed the following statement:

DELETE FROM Dept_Table WHERE Dept_name= 'sales';

Similar to TXB and TXC, transaction TXE deletes a row from the Dept_Table in which the deleted row is the "sales" department row. Section 7120 in FIG. 7 illustrates the Dept_Table after transaction TXE executes this statement and commits. In particular, transaction TXE deletes the "sales" row from the Dept_Table (i.e., row 724). Since this row no longer exists, the row_SCN value for this row is not updated with the commit time of TXE. However, the LD_SCN for the key range affected by this delete statement is updated to reflect the commit time for TXE. Specifically, the LD_SCN 728 for key range M–Z is updated to include the value "25", which is the commit time of TXE.

Since transaction TXE has deleted a row from the table, the dep_SCN of this transaction is determined by taking the maximum of the row_SCN value of each row deleted by TXE, which is determined as follows:

Dep_SCN=max (row_SCN of row "sales")=5

Thus, transaction TXE is considered to be dependent upon each prior transaction having a commit time of 5 or less. Row 810 in the dependent SCN table 800 of FIG. 8 is updated to reflect this dep_SCN value for TXE.

Transaction TXF having a commit time of 30 executes the following statement:

INSERT INTO Dept_Table VALUES('sales', 'CA');

Section 722 in FIG. 7 illustrates the Dept_Table after transaction TXF executes this statement and commits. In particular, transaction TXF inserts a new "sales" row into the Dept_Table (i.e., row 728). The row_SCN value for this new row 728 is updated with the commit time of TXF. However, the LD_SCN for the key range affected by this transaction is not updated, since TXF has not deleted any rows. Note that the new row 728 is not the same row as the previously deleted "sales" row 724, even though both rows contain the same key value in the constrained column. Thus, the LD_SCN value of the key range for the newly inserted row is used to determine the dep_SCN value of the transaction:

Dep_SCN=max(LD_SCN of key range for rows inserted by TXF)=max(LD_SCN of key range M–Z)= 25

Thus, transaction TXF is considered to be dependent upon each prior transaction having a commit time of 25 or less. Row 812 in the dependent SCN table 800 of FIG. 8 is updated to reflect this dep_SCN value for TXF.

Figure 9:
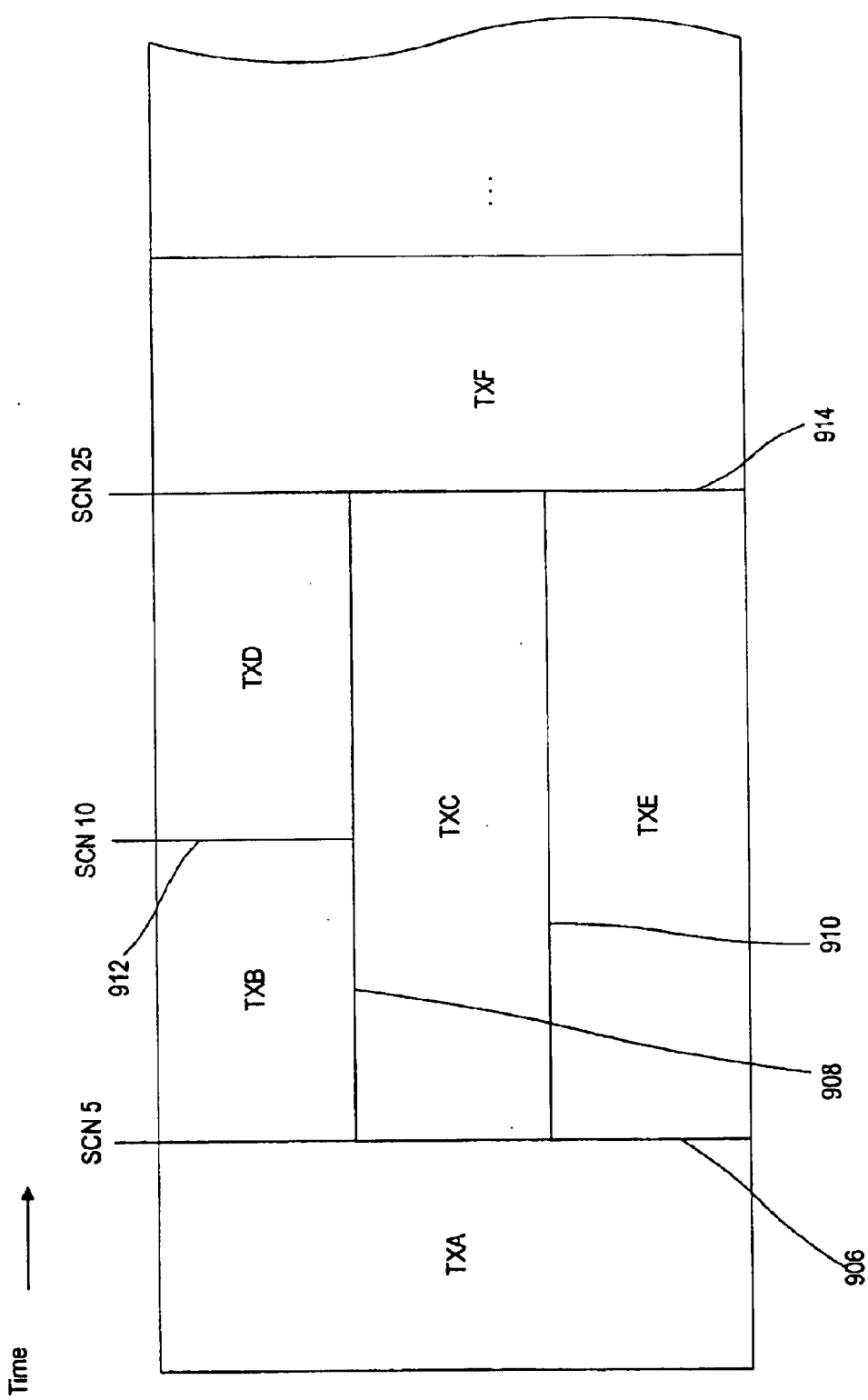
FIG. 9 shows a scheduling plan corresponding to the transactions of FIGS. 7–8.

The dependency ordering of transactions TXA-TXF can be established once the dep_SCN values for these transactions have been determined. FIG. 9 illustrates an ordering schedule for these transactions based upon the analysis of the dep_SCNs values for each transaction, as shown in FIG. 8. In FIG. 9, the ordering schedule proceeds from left to right, with required ordering of transactions indicated by vertical bars between transactions. Transactions that are not dependent upon each other, and are therefore permitted to run in parallel, later, or earlier than each other, are separated by horizontal bars.

Since transaction TXA has a dependent SCN of "0", this transaction is not dependent upon any other transactions, and can be ordered before, after or parallel to any other transaction, subject to the ordering/dependency constraints of these other transactions. Transactions TXB, TXC, and TXE all have dep_SCN values of 5; therefore, these transactions must be scheduled to begin after all other transactions having SCN values of 5 or less have completed and committed. Only TXA has a SCN value less than 5. Thus, vertical bar 906 representing a SCN of 5 is shown in ordering schedule 900 separating transactions TXB, TXC, and TXE from transaction TXA. Since transactions TXB, TXC, and TXE all have the same dep_SCN value, they are permitted to execute independently of each other, including before, after, or in parallel to each other. Thus, horizontal bars 908 and 910 are used to separate these three transactions.

Transaction TXD has a dep_SCN value of 10; therefore, TXD must be scheduled to run after any prior transaction having a SCN of 10 or less has already executed and committed. Therefore, transaction TXD is dependent upon TXB since transaction TXB has, a SCN of 10. A vertical bar 912 is used to separate TXB and TXD to indicate the dependency between these two transactions. Since transactions TXC and TXE has SCN values higher than 10, these transactions have no dependencies with respect to TXD. Therefore, TXD, TXC, and TXE can each be executed independently of each other, as represented by horizontal bars 908 and 910. Note the interesting situation that transactions TXC and TXE can be executed independently of both TXB and TXE, but that TXC and TXE has a dependency with each other.

Transaction TXF has a dep_SCN value of 25; therefore, it is dependent upon all transactions having a SCN value of 25 or less. Since the other transaction TXA-TXE all have SCN values of 25 or less, TXF must be executed only after all other transactions have executed and committed. Thus, a vertical bar 914 separates TXF from all other transactions.

Dependency Tracking for Referential Integrity Constraints

Different tables in a relational database system may be related by common columns, and the rules that govern the relationship between related columns are commonly referred to as "referential integrity" rules or constraints. In many referential relationships between tables, one or more columns in a "child" table are used as references to corresponding columns in "parent" tables. The referencing column in the child table is referred to as a "foreign key" and the referenced column in the parent table is referred to as a "referenced" or "primary" key. A common reason to employ such relationships is to normalize the storage of information from very large, detailed 'fact" table to one or more decentralized "dimension" tables. Rather than storing or duplicating detail information in child tables, foreign key values are used to reference the appropriate row in a parent table that contains more detailed information relevant to the row in the child table. The "lookup" process to match a row in the child table with a corresponding row in a parent table is performed by matching a foreign key value in the child table with a primary/referenced key value in a parent table.

Figure 10A:
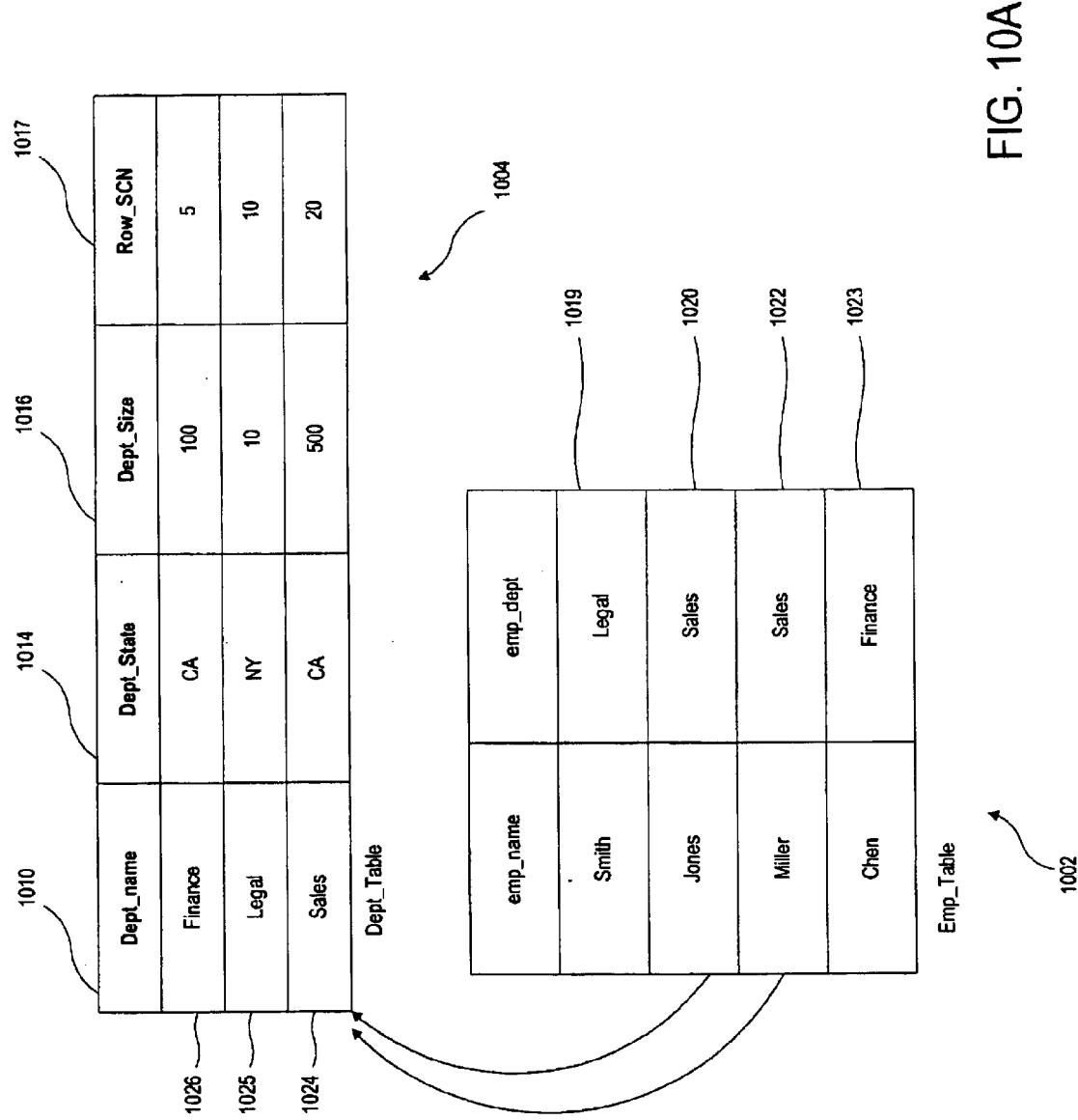
FIG. 10A show an example of a referential relationship between a parent table and a child table.

To illustrate such relationships between tables, shown in FIG. 10A is an Employee Information Table 1002 ("Emp_Table") that is related to a Department Information Table 1004 ("Dept_Table"). In this example, the Emp_Table 1002 is the child table while the Dept_Table 1004 is the parent table. These types of relationships between tables are utilized to organize information such that a child table contains primary information relevant to the table as well as references to corresponding rows in one or more parent tables. The emp_dept column 1008 in Emp_Table 1002 is a reference to the dept_T column 1010 in the Dept_Table 1004. In this situation, the emp_dept column 1008 is the foreign key and the dept_name column 1010 is the referenced key.

In Emp_Table 1002, the emp_name column 1012 is used to store the name of employees while the emp dept column 1008 is used to store the name of the department associated with an employee. The detailed information relating to each department is stored in the Dept_Table 1004. For example, the dept_state column 1014 and dept_size column 1016 are used to store the state and size of each department, respectively.

One reason to utilize this structure is that multiple employees in the Emp_Table 1002 could belong to the same department. For example, rows 1020 and 1022 in Emp_Table 1002 both contain the value "sales" in the emp_dept column 1008. Rather than storing the same department state and department size information for the sales department multiple times in emp_table 1002, once for each row having the value "sales" in column 1008, that information is stored only one time in the row in the Dept_Table 1004 corresponding to the "sales" department. If the detailed information for that department is required, then the foreign key reference from the Emp_Table 1002 can be followed, through the referenced key, to the appropriate row in the Dept Table 1004 to find that detailed information. Multiple parent tables could exist for each child table. An example of such relationships is the "star schema" employed for many data warehousing applications.

One common referential integrity constraint requires that for each row in a child table, the value in the foreign key matches a value in the parent's referenced key. The corollary to this constraint is that a referenced key value in a parent table cannot be removed unless no foreign keys in child tables exist that match that referenced key value. For these referential integrity constraints, the following are examples of two sources of dependencies:

1. Insert of a foreign key value into a child table is dependent upon the existence of a corresponding referenced key value in a parent table. In other words, a row having a particular foreign key value can be inserted into the child table only if there is already a row in the parent table having the same referenced key value.

2. Delete of a row from a parent table having a particular referenced key value is dependent upon the delete of all rows in child tables whose foreign key matches the deleted row's referenced key. To restate this, a row having a referenced key value from a parent table cannot be deleted unless there exists no child tables with rows having that same foreign key value.

To illustrate the first of these situations, assume that a first transaction TX1 performs the action of inserting row 1024 into the Dept_Table 1004. A subsequent transaction TX2 performs the action of inserting row 1020 into the Emp_Table 1002. In this case, the foreign key value "sales" in row 1020 is not valid unless this key exists as a primary key in the parent table 1004. Thus, transaction TX1 must be executed and committed before transaction TX2 is processed. In this situation, TX2 is dependent upon TX1.

To illustrate the second of these situations, assume that it is desired to delete row 1024 from the Dept_Table 1004. In this case, this delete of row 1024 cannot occur unless rows 1020 and 1022 are first deleted. If a first transaction TX3 performs the action of deleting rows 1020 and 1022, and a subsequent transaction TX4 performs the action of deleting row 1024, then TX4 is dependent upon TX3 since a referential integrity violation would occur if the transactions were performed out of order.

According to the invention, the dependency tracking of referential integrity constrained tables is accomplished by use of data structures to track the row-based commit time as well as the last delete commit time for certain key ranges in database tables. These data structures are implemented, according to an embodiment of the invention, using the row_SCN and LD_SCN values described above.

Figure 11:
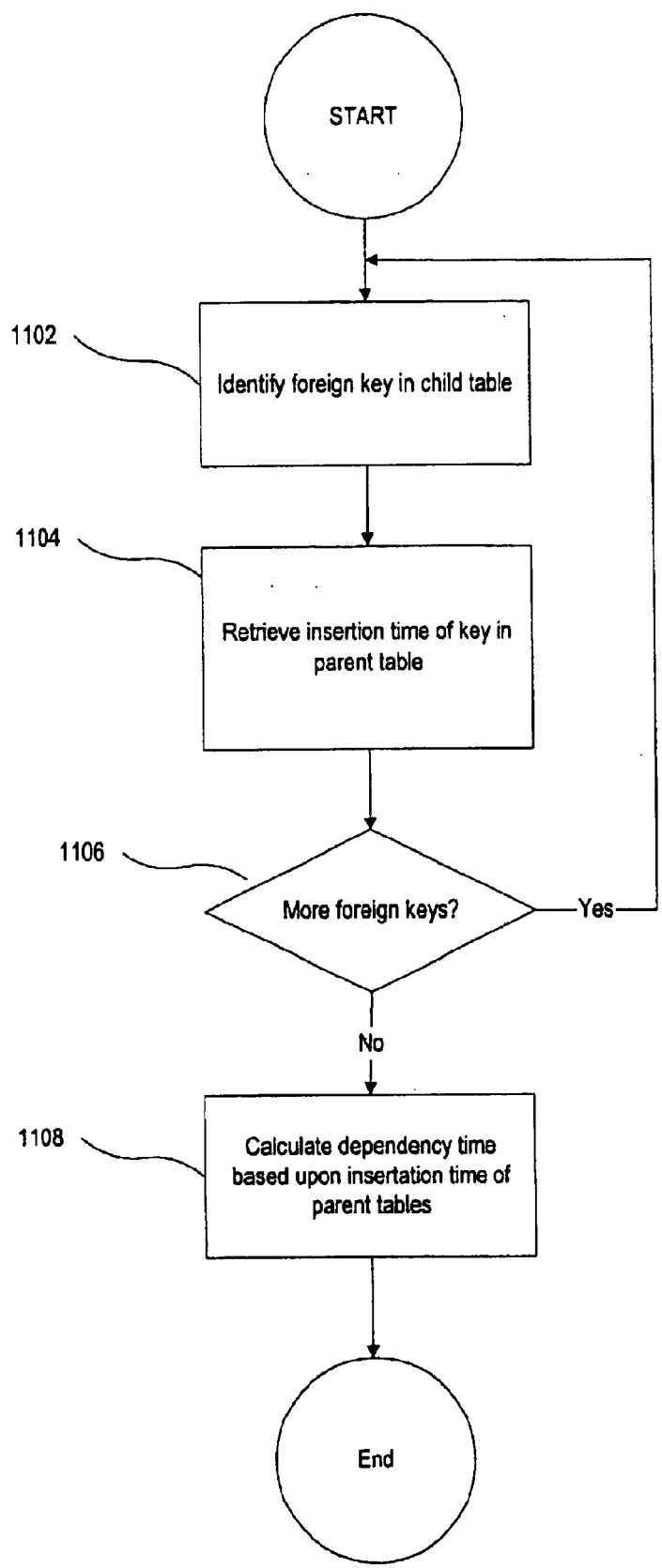
FIG. 11 shows a process flowchart of an embodiment of the invention for referential constraint dependency tracking.

The process of FIG. 11 is employed to track dependencies when inserting a row into a child table. Recall that a row in a child table is permitted only if the foreign keys in that row presently exist as referenced keys in the relevant parent tables. At 1102, an identification is made of a foreign key in the row to be inserted into the child table. Based upon that foreign key, the insertion time of the corresponding referenced key is retrieved from the parent table (1104). According to an embodiment of the invention, the insertion time of the key in the parent table is computed by walking an index on the parent table to perform a lookup operation that ascertains the rowid identifier of the row with the identified key. The parent table is configured to store the row-based commit time, or row_SCN. The rowid identifier is used to lookup the row from the appropriate data block for the table. The row in the table contains the row level SCN ("row_SCN") for that row, which is the last insert or modification time for that row. This row_SCN value is used as the insertion time for the identified key. This process is repeated for every foreign key identified in the row to be inserted into the child table (1106). The dependency time (dep_SCN) of the insert operation is the largest of the insertion times for the identified keys in the row to be inserted into the child table (1108).

To illustrate this aspect of the invention, consider a transaction TX5 that inserts rows 1019 and 1020 into the Emp_Table 1002 using the following SQL-based pseudocode statements:

INSERT INTO Emp_Table VALUES('Smith', 'legal');
INSERT INTO Emp_Table VALUES('Jones', 'sales');

The dep_SCN for this transaction is computed by taking the maximum insertion time for all keys relating to referenced keys in the parent table 1004. The first insert statement inserts a row having the foreign key value "legal", which corresponds to the same key in row 1025 of the parent table 1004 (Dept_Table). The insertion time for this key is the row_SCN value for this row in table 1004, as shown in column 1027, which has a value of "10". The second insert statement inserts a row having the foreign key value "sales", which corresponds to the same key in row 1024 of parent table 1004. The insertion time for this key is the row_SCN value for row 1024, which is "20".

The dependent commit time, or dep_SCN, of transaction TX5 is the maximum insertion value of all the affected keys in the transaction. Thus, the dep_SCN value is equal to max(row_SCN of "legal", row_SCN of "sales")=max(10, 20)=20. In other words, this transaction is considered to be dependent upon any other transactions having a SCN of 20 or less. Thus, TX5 is to be ordered after the execution and commit of all transactions having a commit time of 20 or less. TX5 is not dependent upon any other transactions having a commit time of greater than 20; thus, this transaction can be ordered before, after, or in parallel to any other such transactions, subject to any dependency constraints of these other transactions.

Figure 12:
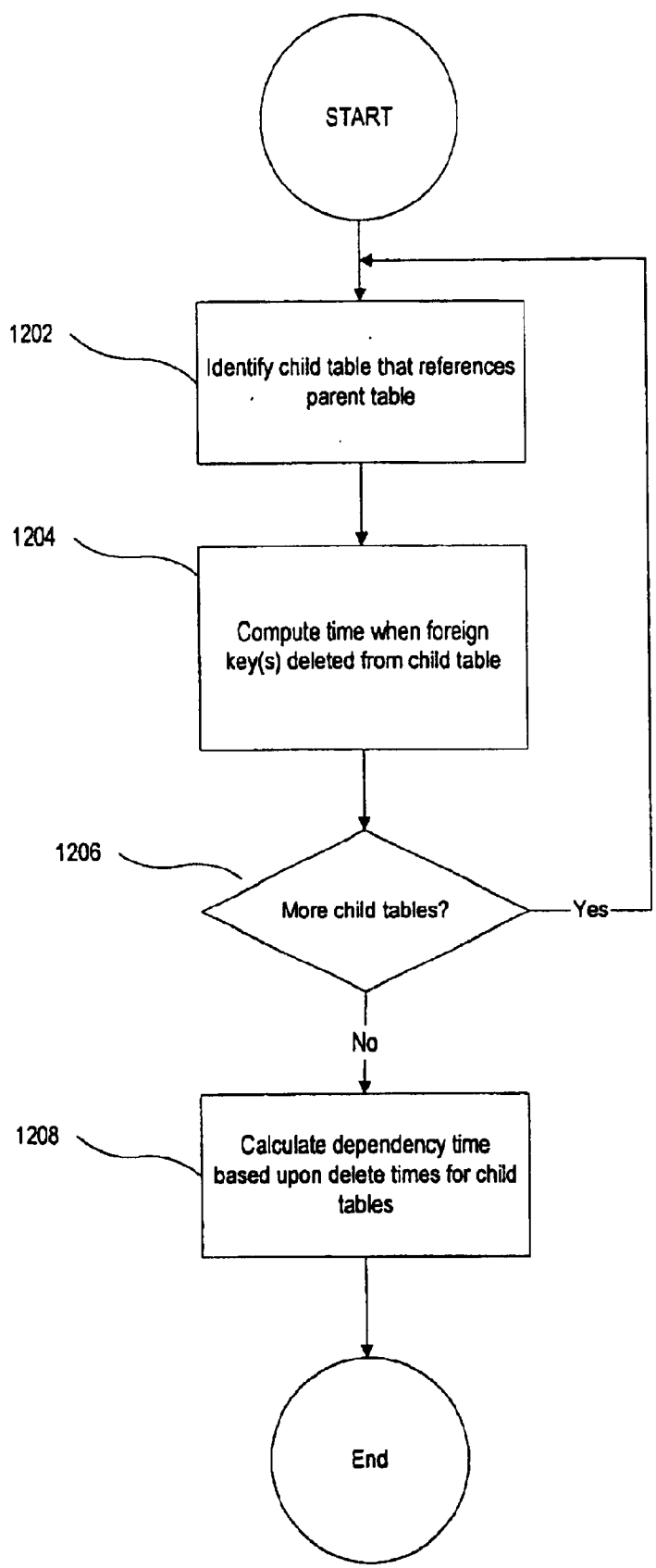
FIG. 12 shows a process flowchart of an alternate embodiment of the invention for referential constraint dependency tracking, which can be used in conjunction with the process of FIG. 11.

The process of FIG. 12 is employed to track dependencies when deleting a row from the parent table. Recall that deletion of a row in a parent table is permitted only if there exists no rows in child tables that reference that parent table row. At 1202, an identification is made of a child table having the appropriate foreign key(s) that referenced the row to be deleted from the parent table. Based upon the key range(s) of the one or more foreign keys, an identification is made of the commit times at which the keys were deleted from the child table (1204). According to an embodiment of the invention, the commit time of the latest delete operations from key ranges in child tables are maintained as LD_SCN values. If a foreign key index is maintained for this child table and LD_SCN values are associated with index structures or ranges in the foreign key index, then this index is walked to find the set of leaf blocks that represents the key ranges of the foreign key values deleted from the child table. The largest of these LD_SCN values is determined for each child table. This process is repeated for every child table having a foreign key corresponding to the deleted referenced key in the parent table (1206). The dependency time (dep_SCN) of the delete operation is the largest of the delete times for the identified key ranges for all the identified child tables (1208).

To illustrate this aspect of the invention, consider a transaction TX8 that deletes rows 1024 and 1026 from the Dept Table 1004. A prior transaction TX6, which committed at time 30, has deleted rows 1020 and 1022 from the Emp_Table 1002. Another prior transaction TX7, which committed at time 35, has deleted row 1023 from the Emp_Table 1002. Assume that the emp_dept key of Emp_Table 1002 is represented as two key ranges, with a first key range for key values beginning with the letters A–L and a second key range for key values beginning with the letter M–Z. The state of Emp_Table 1002 and the LD_SCN values for the foreign key ranges after TX6 and TX7 commit are shown in FIG. 10B. Recall that the Emp_Table 1002 is the child table and the Dept Table 1004 is the parent table in this situation.

In an embodiment of the invention, the dependency time for transaction TX8 is determined by identifying all foreign key ranges affected by the delete operation in TX8, and computing the maximum commit time of the last delete operation performed against these key ranges. In the present example, TX8 deletes key values "legal" and "sales" from the parent table 1004, which affects both foreign key ranges A–L and M–Z for the child table 1002. In this example, the LD_SCN value for the foreign key range A–L is 35 and the LD_SCN value for the foreign key range M–Z is 30. Thus, the dependency time dep_SCN for TX8 is the maximum of these two LD_SCN values, or max(35,30)=35. Thus, transaction TX8 is considered to be dependent upon any other transactions having a SCN of 35 or less. Therefore, transaction TX8 is to be ordered after the execution and commit of all transactions having a commit time of 35 or less. This transaction is not dependent upon any other transactions having a commit time of greater than 35; thus, TX8 can be ordered before, after, or in parallel to any other such transactions, subject to any dependency constraints of these other transactions.

SYSTEM ARCHITECTURE OVERVIEW

Figure 13:
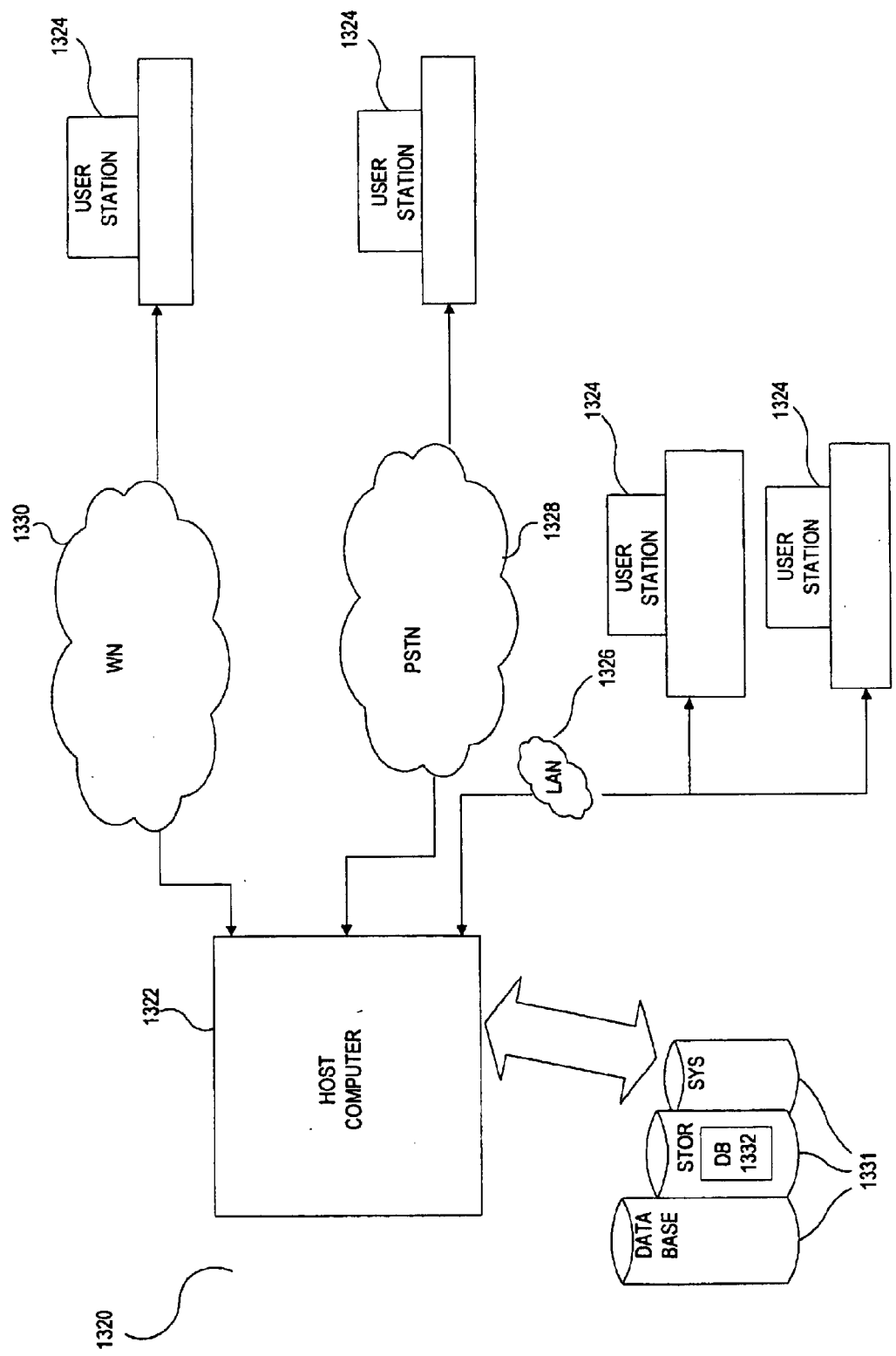
FIGS. 13 and 14 are diagrams of system architectures with which the present invention may be implemented.

Referring to FIG. 13, in an embodiment, a computer system 1320 includes a host computer 1322 connected to a plurality of individual user stations 1324. In an embodiment, the user stations 1324 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1324 are connected to the host computer 1322 via a local area network ("LAN") 1326. Other user stations 1324 are remotely connected to the host computer 1322 via a public telephone switched network ("PSTN") 1328 and/or a wireless network 1330.

In an embodiment, the host computer 1322 operates in conjunction with a data storage system 1331, wherein the data storage system 1331 contains a database 1332 that is readily accessible by the host computer 1322.

In alternative embodiments, the database 1332 may be resident on the host computer, stored, e.g., in the host computer's ROM, PROM, EPROM, or any other memory chip, and/or its hard disk. In yet alternative embodiments, the database 1332 may be read by the host computer 1322 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 1322 can access two or more databases 1332, stored in a variety of mediums, as previously discussed.

Figure 14:
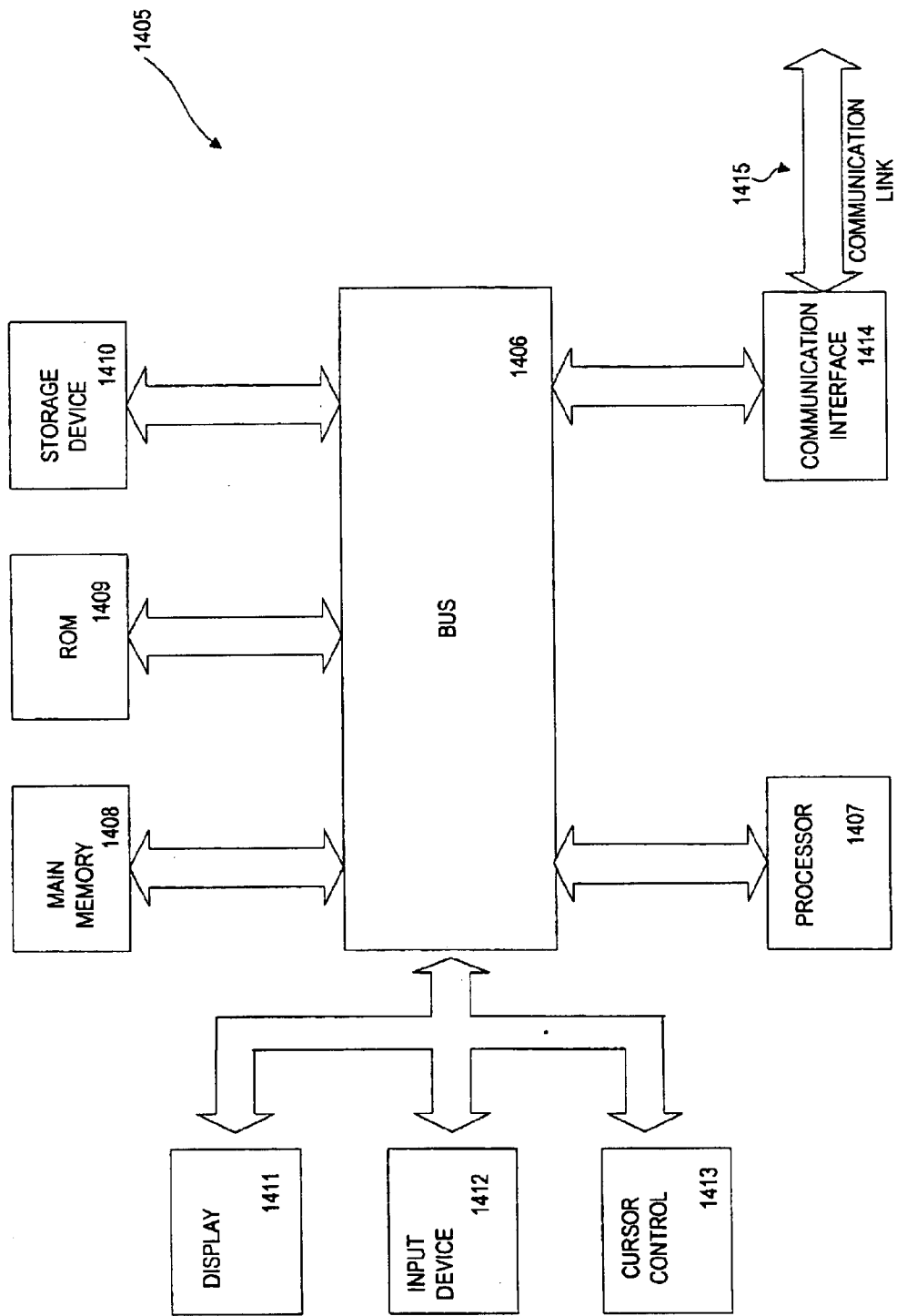

Referring to FIG. 14, in an embodiment, each user station 1324 and the host computer 1322, each referred to generally as a processing unit, embodies a general architecture 1405. A processing unit includes a bus 1406 or other communication mechanism for communicating instructions, messages and data, collectively, information, and one or more processors 1407 coupled with the bus 1406 for processing information. A processing unit also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

A processing unit may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A processing unit may be coupled via the bus 1406 to a display device 1411, such as, but not limited to, a cathode ray tube (CRT), for displaying information to a user. An input device 1412, including alphanumeric and other keys, is coupled to the bus 1406 for communicating information and command selections to the processor(s) 1407. Another type of user input device may include a cursor control 1413, such as, but not limited to, a mouse, a trackball, a fingerpad, or cursor direction keys, for communicating direction information and command selections to the processor(s) 1407 and for controlling cursor movement on the display 1411.

According to one embodiment of the invention, the individual processing units perform specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, a or any other medium from which a processor 1407 can retrieve information.

Various forms of computer-usable media may be involved in providing one or more sequences of one or more instructions to the processor(s) 1407 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1406 may receive the infrared signals and place the instructions therein on the bus 1406. The bus 1406 may carry the instructions to the main memory 1408, from which the processor(s) 1407 thereafter retrieves and executes the instructions. The instructions received by the main memory 1408 may optionally be stored on the storage device 1410, either before or after their execution by the processor(s) 1407.

Each processing unit may also include a communication interface 1414 coupled to the bus 1406. The communication interface 1414 provides two-way communication between the respective user stations 1324 and the host computer 1322. The communication interface 1414 of a respective processing unit transmits and receives electrical, electromagnetic or optical signals that include data streams representing various types of information, including instructions, messages and data.

A communication link 1415 links a respective user station 1324 and a host computer 1322. The communication link 1415 may be a LAN 1326, in which case the communication interface 1414 may be a LAN card. Alternatively, the communication link 1415 may be a PSTN 1328, in which case the communication interface 1414 may be an integrated services digital network (ISDN) card or a modem. Also, as a further alternative, the communication link 1415 may be a wireless network 1330.

A processing unit may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A process for tracking dependencies for uniqueness constrained tables in a database system, comprising:
   identifying a key range in a set of key ranges;
   maintaining a data structure to hold latest commit time information for said key range;
   deleting a row from a table at a commit time, said row having a first key value within said key range;
   updating said data structure based upon said commit time;
   determining a dependency value for one or more data operations operating upon a second key value in said key range based upon said commit time stored in said data structure;
   assigning said dependency value to at least one of said one or more data operations operating upon said second key value in said key range; and
   executing said at least one data operation after deleting said row from said table.

2. The process of claim 1 in which said second key value is equal to said first key value.

3. The process of claim 1 in which an index exists with respect to said table and said key range corresponds to a range of index key values.

4. The process of claim 3 in which said range of index key values is related to an index leaf block.

5. The process of claim 4 further comprising:
   splitting said index leaf block into a plurality of index blocks;
   maintaining a separate data structure for each of said plurality of index blocks, each of said separate data structures having an identical pre-split value from said data structure.

6. The process of claim 4 further comprising:
   coalescing a second index leaf block into said index leaf block to form a coalesced index block, said second index block having a second data structure to track commit times deletions from said second index leaf block, said second data structure having a second commit time; and
   maintaining a single data structure for coalesced index block, said single data structure updated with the later of either the first or second commit times from the first and second data structures.

7. The process of claim 4 in which said range of index key values comprises a subset of keys in said index leaf block.

8. The process of claim 4 in which said range of index key values matches a range of keys in said index leaf block.

9. The process of claim 1 in which said at least one data operation is an insert operation, said insert operation inserting a second row having said second key value in said key range.

10. The process of claim 1 in which said at least one operation is considered dependent upon one or more data operations that commit on or before said commit time.

11. The process of claim 1 in which said at least one operation is considered not to be dependent upon any data operation that commits after said commit time.

12. The process of claim 1 in which said table has a uniqueness constraint upon said key.

13. A computer program product that includes a computer-usable medium having a sequence of instructions which, when executed by a processor, causes said processor to execute a process for tracking dependencies in a database system, said process comprising:
    identifying a key range in a set of key ranges;
    maintaining a data structure to hold latest commit time information for said key range;
    deleting a row from a table at a commit time, said row having a first key value within said key range;
    updating said data structure based upon said commit time;
    determining a dependency value for one or more data operations operating upon a second key value in said key range based upon said commit time stored in said data structure;
    assigning said dependency value to at least one of said one or more data operations operating upon said second key value in said key range; and
    executing said at least one data operation after deleting said row from said table.

14. The computer program product of claim 1 in which said second key value is equal to said first key value.

15. The computer program product of claim 1 in which an index exists with respect to said table and said key range corresponds to a range of index key values.

16. The computer program product of claim 15 in which said range of index key values is related to an index leaf block.

17. The computer program product of claim 16 further comprising:
    splitting said index leaf block into a plurality of index blocks;
    maintaining a separate data structure for each of said plurality of index blocks, each of said separate data structures having an identical pre-split value from said data structure.

18. The computer program product of claim 16 further comprising:
coalescing a second index leaf block into said index leaf block to form a coalesced index block, said second index block having a second data structure to track commit times deletions from said second index leaf block, said second data structure having a second commit time;
maintaining a single data structure for coalesced index block, said single data structure updated with the later of either the first or second commit times from the first and second data structures.

19. The computer program product of claim 16 in which said range of index key values comprises a subset of keys in said index leaf block.

20. The computer program product of claim 16 in which said range of index key values matches a range of keys in said index leaf block.

21. The computer program product of claim 13 in which said at least one data operation is an insert operation, said insert operation inserting a second row having said second key value in said key range.

22. The computer program product of claim 13 in which said at least one operation is considered dependent upon one or more data operations that commit on or before said commit time.

23. The computer program product of claim 13 in which said at least one operation is considered not to be dependent upon any data operation that commits after said commit time.

24. The computer program product of claim 13 in which said table has a uniqueness constraint upon said key.

* * * * *